US007829777B2

(12) United States Patent
Kyuma et al.

(10) Patent No.: US 7,829,777 B2
(45) Date of Patent: Nov. 9, 2010

(54) MUSIC DISPLAYING APPARATUS AND COMPUTER-READABLE STORAGE MEDIUM STORING MUSIC DISPLAYING PROGRAM

(75) Inventors: Koichi Kyuma, Kyoto (JP); Yuichi Ozaki, Kyoto (JP); Takahiko Fujita, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 368 days.

(21) Appl. No.: 12/071,708

(22) Filed: Feb. 25, 2008

(65) Prior Publication Data

US 2009/0165633 A1 Jul. 2, 2009

(30) Foreign Application Priority Data

Dec. 28, 2007 (JP) ............................ 2007-339372

(51) Int. Cl.
*G09B 15/00* (2006.01)
*G09B 15/02* (2006.01)
*G10H 1/00* (2006.01)

(52) U.S. Cl. ......................... 84/477 R; 84/609; 84/610; 84/615; 84/649; 84/650; 84/653

(58) Field of Classification Search ....................... None
See application file for complete search history.

(56) References Cited

U.S. PATENT DOCUMENTS

| | | | | |
|---|---|---|---|---|
| 4,771,671 A * | 9/1988 | Hoff, Jr. | ...................... | 84/645 |
| 7,488,886 B2 * | 2/2009 | Kemp | .......................... | 84/609 |
| 7,605,322 B2 * | 10/2009 | Nakamura | ................... | 84/613 |
| 2007/0131094 A1 * | 6/2007 | Kemp | .......................... | 84/609 |

FOREIGN PATENT DOCUMENTS

JP A-2000-056785 2/2000

* cited by examiner

*Primary Examiner*—Marlon T Fletcher
(74) *Attorney, Agent, or Firm*—Nixon & Vanderhye P.C.

(57) ABSTRACT

A music displaying apparatus stores in advance music piece related information concerning a music piece, and a plurality of comparison parameters which is associated with the music piece related information. The music displaying apparatus obtains voice data concerning singing of a user, analyzes the voice data to calculate a plurality of singing characteristic parameters which indicate a characteristic of the singing of the user. Next, the music displaying apparatus compares the plurality of singing characteristic parameters with the plurality of comparison parameters to calculate a similarity between the plurality of singing characteristic parameters and the plurality of comparison parameters. Then, the music displaying apparatus selects at least one piece of the music piece related information which is associated with a comparison parameter which has a high similarity with the singing characteristic parameter, and shows certain information based on the music piece related information.

30 Claims, 23 Drawing Sheets

FIG. 13

247

2471

2472

| GENRE NAME | SINGING VOICE PARAMETER DEFINITION | | | | | | | | | |
|---|---|---|---|---|---|---|---|---|---|---|
| | VOICE VOLUME | GROOVE | ACCENT | STRENGTH | MUSICAL INTERVAL SENSE | RHYTHM | VIBRATO | ROLL | SINGING RANGE | VOICE QUALITY |
| POP | 50 | 50 | 50 | 40 | 65 | 70 | 20 | 30 | 50 | 50 |
| ENKA | 60 | 35 | 80 | 60 | 30 | 20 | 85 | 90 | 70 | 50 |
| ROCK | 70 | 50 | 15 | 65 | 65 | 70 | 30 | 30 | 50 | 30 |
| R&B | 70 | 70 | 40 | 30 | 85 | 85 | 90 | 70 | 80 | 70 |
| HIP-HOP | 50 | 60 | 15 | 75 | 20 | 85 | 10 | 20 | 35 | 50 |
| BALLADE | 40 | 60 | 70 | 30 | 90 | 50 | 40 | 30 | 50 | 70 |
| IDOL | 50 | 65 | 20 | 35 | 30 | 70 | 20 | 40 | 40 | 90 |
| CARTOON | 50 | 70 | 20 | 65 | 70 | 50 | 60 | 50 | 50 | 90 |
| FOLK | 30 | 75 | 80 | 30 | 60 | 35 | 30 | 30 | 50 | 60 |
| MUDO KAYO | 40 | 80 | 25 | 60 | 75 | 60 | 50 | 60 | 60 | 15 |

FIG. 14

248

| MUSIC PIECE NUMBER (2481) | BIBLIOGRAPHICAL DATA (2482) | MUSICAL SCORE DATA (2483) |
|---|---|---|
| 001 | ... | ... |
| 002 | ... | ... |
| 003 | ... | ... |
| ⋮ | ⋮ | ⋮ |

FIG. 15

249

| MUSIC PIECE NUMBER (2491) | MUSIC PIECE PARAMETER (2492) | | | | |
|---|---|---|---|---|---|
| | MUSICAL INTERVAL SENSE | RHYTHM | VIBRATO | ROLL | VOICE QUALITY |
| 001 | 50 | 65 | 30 | 40 | 20 |
| 002 | 85 | 80 | 90 | 25 | 70 |
| 003 | 30 | 70 | 60 | 65 | 90 |
| ⋮ | ⋮ | ⋮ | ⋮ | ⋮ | ⋮ |

FIG. 16

250

2501 2502

| MUSIC PIECE NUMBER | GENRE CORRELATION VALUE | | | | | | | | | |
|---|---|---|---|---|---|---|---|---|---|---|
| | POP | ENKA | ROCK | R&B | HIP-HOP | BALLADE | IDOL | CARTOON SONG | FOLK | MUDO KAYO |
| 001 | −0.5 | +0.5 | −0.5 | −0.8 | −0.5 | −0.05 | +0.6 | −0.1 | 0 | +0.2 |
| 002 | −0.5 | −0.05 | −0.9 | −0.6 | −0.5 | +0.8 | −0.6 | −0.1 | +0.1 | +0.1 |
| 003 | +0.6 | −0.4 | +0.2 | −0.6 | −0.5 | −0.2 | +0.4 | +0.1 | −0.15 | 0 |
| ⋮ | ⋮ | ⋮ | ⋮ | ⋮ | ⋮ | ⋮ | ⋮ | ⋮ | ⋮ | ⋮ |

F I G. 1 7

253

| | VOICE VOLUME | GROOVE | ACCENT | STRENGTH | MUSICAL INTERVAL SENSE | RHYTHM | VIBRATO | ROLL | SINGING RANGE | VOICE QUALITY |
|---|---|---|---|---|---|---|---|---|---|---|
| 2531 | VOICE VOLUME | GROOVE | ACCENT | STRENGTH | MUSICAL INTERVAL SENSE | RHYTHM | VIBRATO | ROLL | SINGING RANGE | VOICE QUALITY |
| 2532 | 75 | 50 | 65 | 30 | 40 | 65 | 30 | 40 | 20 | 20 |

FIG. 18

254

2541 / 2542

| POP | ENKA | ROCK | R&B | HIP-HOP | BALLADE | IDOL | CARTOON SONG | FOLK | MUDO KAYO |
|---|---|---|---|---|---|---|---|---|---|
| −0.45 | +0.5 | −0.5 | −0.1 | −0.6 | −0.1 | +0.1 | −0.1 | 0 | +0.1 |

FIG. 19

255

2551 / 2552

| MUSIC PIECE NUMBER | CORRELATION VALUE |
|---|---|
| 001 | 0.4 |
| 002 | 0.2 |
| 003 | 0.75 |
| 004 | 0.45 |
| ⋮ | ⋮ |

FIG. 20

256

2561 / 2562

| MUSIC PIECE NUMBER | CORRELATION VALUE |
|---|---|
| 003 | 0.75 |
| 007 | 0.8 |
| 011 | 0.7 |
| 020 | 0.9 |
| ⋮ | ⋮ |

| MUSICAL INSTRUMENT | VOICE QUALITY |
|---|---|
| ELECTRIC GUITAR | 1 |
| SYNTH LEAD | 2 |
| TRUMPET | 2 |
| FLUTE | 9 |

F I G. 26

EXAMPLE OF SETTING OF MUSICAL INSTRUMENT TENDENCY VALUES

| | POP | ROCK | ··· |
|---|---|---|---|
| GUITAR | 6 | 5 | ··· |
| PIANO | 7 | 3 | ··· |
| VIOLIN | 4 | 1 | ··· |
| ⋮ | ⋮ | ⋮ | ⋮ |

F I G. 27

EXAMPLE OF SETTING OF TEMPO TENDENCY VALUES

| | POP | ROCK | ··· |
|---|---|---|---|
| ~65 | 4 | 1 | ··· |
| ~85 | 5 | 6 | ··· |
| ~110 | 3 | 7 | ··· |
| ⋮ | ⋮ | ⋮ | ⋮ |

F I G. 28

EXAMPLE OF SETTING OF KEY TENDENCY VALUES

| | POP | ROCK | ··· |
|---|---|---|---|
| MAJOR KEY | 6 | 5 | ··· |
| MINOR KEY | 7 | 3 | ··· |

FIG. 35A

255

| MUSIC PIECE | CORRELATION VALUE |
|---|---|
| MUSIC PIECE 1 | +0.1 |
| MUSIC PIECE 2 | +0.4 |
| MUSIC PIECE 3 | +0.2 |
| MUSIC PIECE 4 | +0.2 |
| MUSIC PIECE 5 | +0.8 |

FIG. 35B

2541

| |
|---|
| POP |
| ROCK |
| CARTOON |
| ⋮ |

FIG. 35C

| | FIRST PLACE | SECOND PLACE | THIRD PLACE | |
|---|---|---|---|---|
| MUSIC PIECE 1 | POP | ROCK | CARTOON | ... |
| MUSIC PIECE 2 | ROCK | R&B | IDOL | ... |
| MUSIC PIECE 3 | POP | ROCK | ENKA | ... |
| MUSIC PIECE 4 | ROCK | IDOL | POP | ... |
| MUSIC PIECE 5 | POP | IDOL | ROCK | ... |

FIG. 35D

256

| MUSIC PIECE | CORRELATION VALUE |
|---|---|
| MUSIC PIECE 1 | +0.1 |
| MUSIC PIECE 3 | +0.2 |
| MUSIC PIECE 5 | +0.8 |

MUSIC DISPLAYING APPARATUS AND COMPUTER-READABLE STORAGE MEDIUM STORING MUSIC DISPLAYING PROGRAM

CROSS REFERENCE OF RELATED APPLICATION

The disclosure of Japanese Patent Application No. 2007-339372, filed on Dec. 28, 2007, is incorporated herein by reference.

TECHNICAL FIELD

The illustrative embodiments relate to a music displaying apparatus and a computer-readable storage medium storing a music displaying program for displaying a music piece to a user, and more particularly, to a music displaying apparatus and a computer-readable storage medium storing a music displaying program for analyzing user's singing voice, thereby displaying a music piece.

BACKGROUND AND SUMMARY

Karaoke apparatuses, which have a function of analyzing singing of a singing person to report a result in addition to a function of playing a karaoke music piece, have been put to practical use. For example, a karaoke apparatus is disclosed, which analyzes formant of a singing voice of the singing person and displays a portrait of a professional singer having a voice similar to that of the singing person (e.g. Japanese Laid-Open Patent Publication No. 2000-56785). The karaoke apparatus includes a database in which formant data of voices of a plurality of professional singers is stored in advance. Formant data obtained by analyzing the singing voice of the singing person is collated with the formant data stored in the database, and a portrait of a professional singer having a high similarity is displayed. Further, the karaoke apparatus is capable of displaying a list of music pieces of the professional singer.

However, the above karaoke apparatus disclosed in Japanese Laid-Open Patent Publication No. 2000-56785 has the following problem. The karaoke apparatus merely determines whether or not the voice of the singing person (the formant data) is similar to the voices of the professional singers, which are stored in the database, and does not take into consideration a characteristic (a way) of the singing of the singing person. In other words, only a portrait of a professional singer having a voice similar to that of the singing person, and a list of music pieces of the professional singer are shown, and the shown music pieces are not necessarily easy or suitable for the singing person to sing. For example, the karaoke apparatus cannot show a music piece of a genre at which the singing person is good. Therefore, a feature of the illustrative embodiments is to provide a music displaying apparatus and a computer-readable storage medium storing a music displaying program for analyzing a singing characteristic of the singing person, thereby displaying a music piece and a genre which are suitable for the singing person to sing.

The illustrative embodiments may have the following exemplary features. It is noted that reference numerals and supplementary explanations in parentheses are merely provided to facilitate the understanding of the illustrative embodiments in relation to certain illustrative embodiments.

A first illustrative embodiment may have a music displaying apparatus comprising voice data obtaining means (21), singing characteristic analysis means (21), music piece related information storage means (24), comparison parameter storage means (24), comparison means (21), selection means (21), and displaying means (12, 21). The voice data obtaining means is means for obtaining voice data concerning singing of a user. The voice data obtaining means is means for obtaining voice data concerning singing of a user. The singing characteristic analysis means is means for analyzing the voice data to calculate a plurality of singing characteristic parameters which indicate a characteristic of the singing of the user. The music piece related information storage means is means for storing music piece related information concerning a music piece. The comparison parameter storage means for storing a plurality of comparison parameters, which is to be compared with the plurality of singing characteristic parameters, so as to be associated with the music piece related information. The comparison means for comparing the plurality of singing characteristic parameters with the plurality of comparison parameters to calculate a similarity between the plurality of singing characteristic parameters and the plurality of comparison parameters. The selection means is means for selecting at least one piece of the music piece related information which is associated with a comparison parameter which has a high similarity with the singing characteristic parameter. The displaying means is means for displaying information based on the music piece related information selected by the selection means.

According to an exemplary feature of the first illustrative embodiment, it is possible to show to the user information based on the music piece related information, which takes into consideration the characteristic of the singing of the user, for example, information concerning a karaoke music piece suitable for the user to sing, and a music genre suitable for the user to sing.

In another exemplary feature of the first illustrative embodiment, the music piece related information storage means stores, as the music piece related information, music piece data for reproducing at least the music piece. The comparison parameter storage means stores, as the comparison parameter, a parameter which indicates a musical characteristic of the music piece so as to be associated with the music piece data. The selection means selects at least one piece of the music piece data which is associated with the comparison parameter which has the high similarity with the singing characteristic parameter. The displaying means shows information of the music piece based on the music piece data selected by the selection means.

According to an exemplary feature of the first illustrative embodiment, information of a music piece, such as a karaoke music piece suitable for the user to sing, and the like, can be shown.

In an exemplary feature of the first illustrative embodiment, the comparison parameter storage means further stores, as the comparison parameter, a parameter which indicates a musical characteristic of the music genre. The music piece related information storage means further stores, as the music piece related information, genre data which indicates a music genre. The music displaying apparatus further comprises music piece genre similarity data storage means (24), and voice genre similarity calculation means (21). The music piece genre similarity data storage means is means for storing music piece genre similarity data which indicates a similarity between the music piece and the music genre. The voice genre similarity calculation means is means for calculating a similarity between the singing characteristic parameter and the music genre. The selection means selects the music piece data based on the similarity calculated by the voice genre similarity calculation means and the music piece genre similarity data stored by the music piece genre similarity data storage means.

In another exemplary feature of the first illustrative embodiment, the music piece data includes musical score data for indicating musical instruments used for playing the music piece, a tempo of the music piece, and a key of the music piece. The music displaying apparatus further comprises music piece genre similarity calculation means for calculating a similarity between the music piece and the music genre based on the musical instruments, the tempo and the key which are included in the musical score data.

According to an exemplary feature of the first illustrative embodiment, a music piece such as a karaoke music piece, and the like can be shown while a music genre suitable for the characteristic of the singing of the user is taken into consideration.

In an exemplary feature of the first illustrative embodiment, each of the plurality of singing characteristic parameters and the plurality of comparison parameters includes a value obtained by evaluating one of accuracy of pitch concerning the singing of the user, variation in pitch, a periodical input of voice, and a singing range.

According to an exemplary feature of the first illustrative embodiment, the similarity can be calculated more accurately.

In an exemplary feature of the first illustrative embodiment, the music piece data includes musical score data which indicates musical instruments used for the music piece, a tempo of the music piece, a key of the music piece, a plurality of musical notes which constitute the music piece. The singing characteristic analysis means includes voice volume/pitch data calculation means for calculating, from the voice data, voice volume value data which indicates a voice volume value, and pitch data which indicates a pitch. The singing characteristic analysis means compares at least one of the voice volume value data and the pitch data with the musical score data to calculate the singing characteristic parameter.

According to an exemplary feature of the first illustrative embodiment, since the singing voice is analyzed based on a musical score, the voice volume, and the pitch, the characteristic of the singing can be calculated more accurately.

In an exemplary feature of the first illustrative embodiment, the singing characteristic analysis means calculates the singing characteristic parameter based on an output value of a frequency component for a predetermined period from the voice volume value data.

In an exemplary feature of the first illustrative embodiment, the singing characteristic analysis means calculates the singing characteristic parameter based on a difference between a start timing of each musical note of a melody part of a musical score indicated by the musical score data and an input timing of voice based on the voice volume value data.

In an exemplary feature of the first illustrative embodiment, the singing characteristic analysis means calculates the singing characteristic parameter based on a difference between a pitch of a musical note of a musical score indicated by the musical score data and a pitch based on the pitch data.

In an exemplary feature of the first illustrative embodiment, the singing characteristic analysis means calculates the singing characteristic parameter based on an amount of change in pitch for each time unit in the pitch data.

In an exemplary feature of the first illustrative embodiment, the singing characteristic analysis means calculates, from the voice volume value data and the pitch data, the singing characteristic parameter based on a pitch having a maximum voice volume value among voices, a pitch of each of which is maintained for a predetermined time period or more.

In an exemplary feature of the first illustrative embodiment, the singing characteristic analysis means calculates a quantity of high frequency components included in the voice of the user from the voice data, and calculates the singing characteristic parameter based on a calculated result.

According to an exemplary feature of the first illustrative embodiment, it is possible to calculate the singing characteristic parameter which more accurately captures the characteristic of the singing of the user.

In another exemplary feature of the first illustrative embodiment, the music piece related information storage means stores, as the music piece related information, genre data which indicates at least a music genre. The comparison parameter storage means stores, as the comparison parameter, a parameter which indicates a musical characteristic of the music genre so as to be associated with the music genre. The selection means selects the music genre which is associated with the comparison parameter which has the high similarity with the singing characteristic parameter. The displaying means shows a name of the music genre as information based on the music piece related information.

According to an exemplary feature of the first illustrative embodiment, a music genre suitable for the characteristic of the singing of the user can be shown.

In an exemplary feature of the first illustrative embodiment, the music piece data includes musical score data for indicating musical instruments used for playing the music piece, a tempo of the music piece, and a key of the music piece. The music displaying apparatus further comprises music piece parameter calculation means for calculating, from the musical score data, the comparison parameter for each music piece. The comparison parameter storage means stores the comparison parameter calculated by the music piece parameter calculation means.

In an exemplary feature of the first illustrative embodiment, the music piece parameter calculation means calculates, from the musical score data, the comparison parameter based on a difference in pitch between two adjacent musical notes, a position of a musical note within a beat, and a total time of musical notes having lengths equal to or larger than a predetermined threshold value.

According to an exemplary feature of the first illustrative embodiment, even in the case where the user composes a music piece or where a music piece is newly obtained by downloading it from a predetermined server, the self composed music piece or the downloaded music piece is analyzed, thereby producing and storing a comparison parameter. Thus, it is possible to show whether or not even the self-composed music piece or the downloaded music piece is suitable for the characteristic of the singing of the user.

A second illustrative embodiment may have a computer-readable storage medium storing a music displaying program which causes a computer of a music displaying apparatus, which shows a music piece to a user, to function as: voice data obtaining means (S44); singing characteristic analysis means (S45); music piece related information storage means (S65); comparison parameter storage means (S47, S48); comparison means (S49), selection means (S49); and displaying means (S51). The voice data obtaining means is means for obtaining voice data concerning singing of the user. The singing characteristic analysis means is means for analyzing the voice data to calculate a plurality of singing characteristic parameters which indicate a characteristic of the singing of the user. The music piece related information storage means is means for storing music piece related information concerning a music piece. The comparison parameter storage means is means for storing a plurality of comparison parameters, which is to be compared with the plurality of singing characteristic parameters, so as to be associated with the music piece related information. The comparison means is means for comparing the plurality of singing characteristic parameters with the plurality of comparison parameters to calculate a similarity between the plurality of singing characteristic parameters and the plurality of comparison parameters. The selection means is means for selecting at least one piece of the music piece related information which is associated with a comparison parameter which has a high similarity with the singing characteristic parameter. The displaying means is means for displaying information based on the music piece related information selected by the selection means.

The second illustrative embodiment may have the same advantageous effects as those of the first illustrative embodiment.

In an exemplary feature of the second illustrative embodiment, the music piece related information storage means stores, as the music piece related information, music piece data for reproducing at least the music piece. The comparison parameter storage means stores, as the comparison parameter, a parameter which indicates a musical characteristic of the music piece so as to be associated with the music piece data. The selection means selects at least one piece of the music piece data which is associated with the comparison parameter which has the high similarity with the singing characteristic parameter. The displaying means shows information of the music piece based on the music piece data selected by the selection means.

According to an exemplary feature of the second illustrative embodiment, the same advantageous effects as those of the second aspect are obtained.

In an exemplary feature of the second illustrative embodiment, the music piece related information storage means further stores, as the music piece related information, genre data which indicates a music genre. The comparison parameter storage means further stores, as the comparison parameter, a parameter which indicates a musical characteristic of the music genre. The music displaying program further causes the computer of the music displaying apparatus to function as music piece genre similarity data storage means (S63), and voice genre similarity calculation means (S66). The music piece genre similarity data storage means is means for storing music piece genre similarity data which indicates a similarity between the music piece and the music genre. The voice genre similarity calculation means is means for calculating a similarity between the singing characteristic parameter and the music genre. The selection means selects the music piece data based on the similarity calculated by the voice genre similarity calculation means and the music piece genre similarity data stored by the music piece genre similarity data storage means.

According to an exemplary feature of the second illustrative embodiment, the same advantageous effects as those of the third aspect are obtained.

In an exemplary feature of the second illustrative embodiment, the music piece data includes musical score data for indicating musical instruments used for playing the music piece, a tempo of the music piece, and a key of the music piece. The music displaying program further causes the computer of the music displaying apparatus to function as music piece genre similarity calculation means (S4) for calculating a similarity between the music piece and the music genre based on the musical instruments, the tempo and the key which are included in the musical score data.

According to an exemplary feature of the second illustrative embodiment, the same advantageous effects as those of the fourth aspect are obtained.

In an exemplary feature of the second illustrative embodiment, each of the plurality of singing characteristic parameters and the plurality of comparison parameters includes a value obtained by evaluating one of accuracy of pitch concerning the singing of the user, variation in pitch, a periodical input of voice, and a singing range.

According to an exemplary feature of the second illustrative embodiment, the same advantageous effects as those of the fifth aspect are obtained.

In an exemplary feature of the second illustrative embodiment, the music piece data includes musical score data which indicates musical instruments used for the music piece, a tempo of the music piece, a key of the music piece, a plurality of musical notes which constitute the music piece. The singing characteristic analysis means includes voice volume/pitch data calculation means for calculating, from the voice data, voice volume value data which indicates a voice volume value, and pitch data which indicates a pitch. The singing characteristic analysis means compares at least one of the voice volume value data and the pitch data with the musical score data to calculate the singing characteristic parameter.

According to an exemplary feature of the second illustrative embodiment, the same advantageous effects as those of the sixth aspect are obtained.

In an exemplary feature of the second illustrative embodiment, the singing characteristic analysis means calculates the singing characteristic parameter based on an output value of a frequency component for a predetermined period from the voice volume value data.

In an exemplary feature of the second illustrative embodiment, the singing characteristic analysis means calculates the singing characteristic parameter based on a difference between a start timing of each musical note of a melody part of a musical score indicated by the musical score data and an input timing of voice based on the voice volume value data.

In an exemplary feature of the second illustrative embodiment, the singing characteristic analysis means calculates the singing characteristic parameter based on a difference between a pitch of a musical note of a musical score indicated by the musical score data and a pitch based on the pitch data.

In an exemplary feature of the second illustrative embodiment, the singing characteristic analysis means calculates the singing characteristic parameter based on an amount of change in pitch for each time unit in the pitch data.

In an exemplary feature of the second illustrative embodiment, the singing characteristic analysis means calculates, from the voice volume value data and the pitch data, the singing characteristic parameter based on a pitch having a maximum voice volume value among voices, a pitch of each of which is maintained for a predetermined time period or more.

In an exemplary feature of the second illustrative embodiment, the singing characteristic analysis means calculates a quantity of high-frequency components included in the voice of the user from the voice data, and calculates the singing characteristic parameter based on a calculated result.

In an exemplary feature of the second illustrative embodiment, the music piece related information storage means stores, as the music piece related information, genre data which indicates at least a music genre. The comparison parameter storage means stores, as the comparison parameter, a parameter which indicates a musical characteristic of the music genre so as to be associated with the music genre. The selection means selects the music genre which is associated with the comparison parameter which has the high similarity with the singing characteristic parameter. The displaying means shows a name of the music genre as information based on the music piece related information.

In an exemplary feature of the second illustrative embodiment, the music piece data includes musical score data for indicating musical instruments used for playing the music piece, a tempo of the music piece, and a key of the music piece. The music displaying program further causes the computer of the music displaying apparatus to function as music piece parameter calculation means (S3) for calculating, from the musical score data, the comparison parameter for each music piece. The comparison parameter storage means stores the comparison parameter calculated by the music piece parameter calculation means.

In an exemplary feature of the second illustrative embodiment, the music piece parameter calculation means calculates, from the musical score data, the comparison parameter based on a difference in pitch between two adjacent musical notes, a position of a musical note within a beat, and a total time of musical notes having lengths equal to or larger than a predetermined threshold value.

According to the second illustrative embodiment, a music piece and a music genre, which are suitable for a singing characteristic of the singing person, can be shown.

BRIEF DESCRIPTION OF THE DRAWINGS

These and other features and advantages may be better and more completely understood by referring to the following detailed description of the drawing, of which:

FIG. 13 illustrates an example of a data structure of a genre master;

FIG. 14 illustrates an example of a data structure of music piece data;

FIG. 15 illustrates an example of a data structure of music piece analysis data;

FIG. 16 illustrates an example of a data structure of a music piece genre correlation list;

FIG. 17 illustrates an example of a data structure of singing voice analysis data;

FIG. 18 illustrates an example of a data structure of a singing voice genre correlation list;

FIG. 19 illustrates an example of a data structure of an intermediate nominee list;

FIG. 20 illustrates an example of a data structure of a nominated music piece list;

FIG. 26 illustrates an example of setting of tendency values used for calculating a musical instrument tendency value;

FIG. 27 illustrates an example of setting of tendency values used for calculating a tempo tendency value;

FIG. 28 illustrates an example of setting of tendency values used for calculating a major/minor key tendency value;

FIG. 35A is an illustrative view for explaining the recommended music piece search processing;

FIG. 35B is an illustrative view for explaining the recommended music piece search processing;

FIG. 35C is an illustrative view for explaining the recommended music piece search processing; and FIG. 35D is an illustrative view for explaining the recommended music piece search processing.

DETAILED DESCRIPTION

Figure 1:
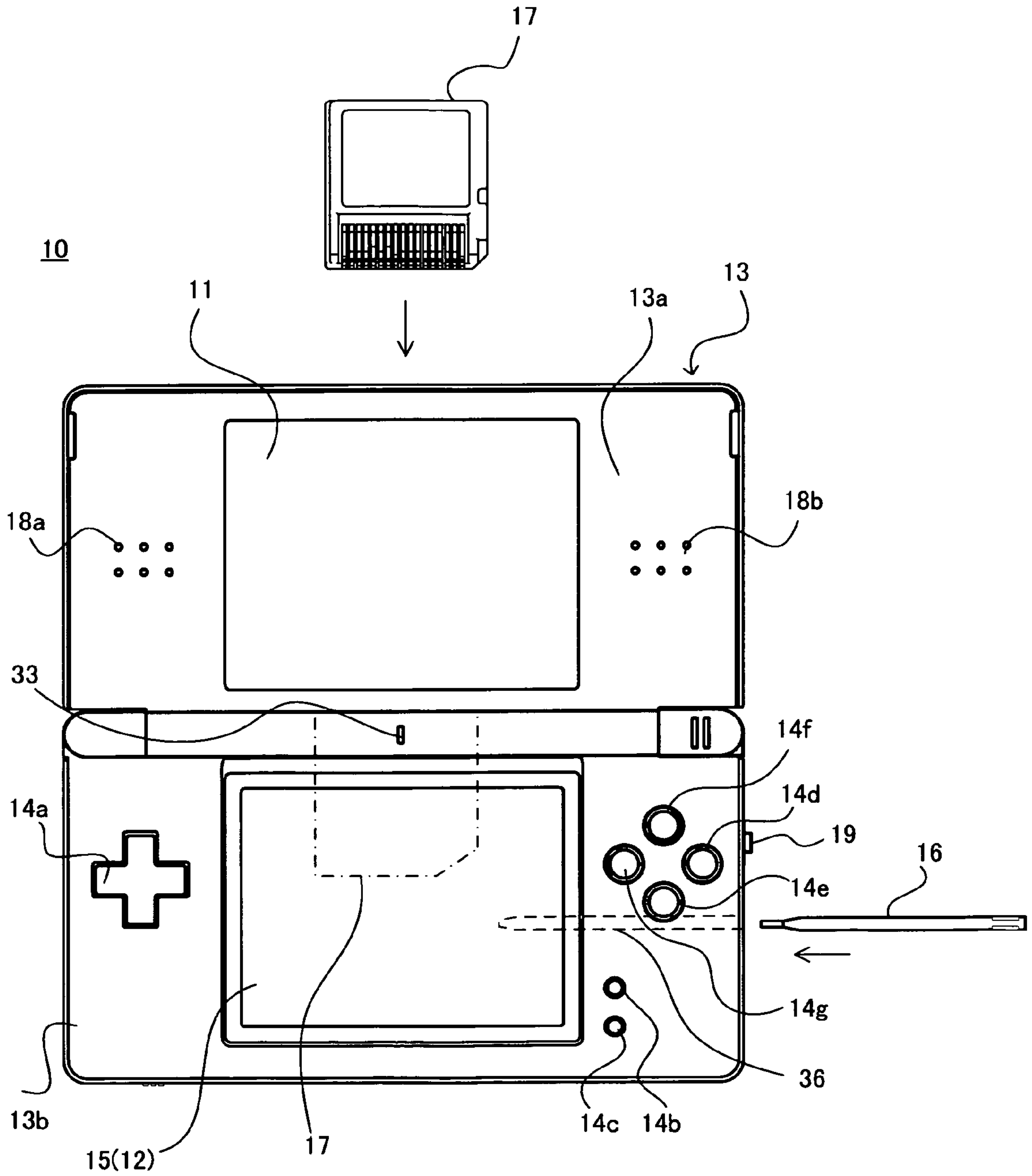
FIG. 1 is an external view of a game apparatus 10 according to an illustrative embodiment.
Figure 2:
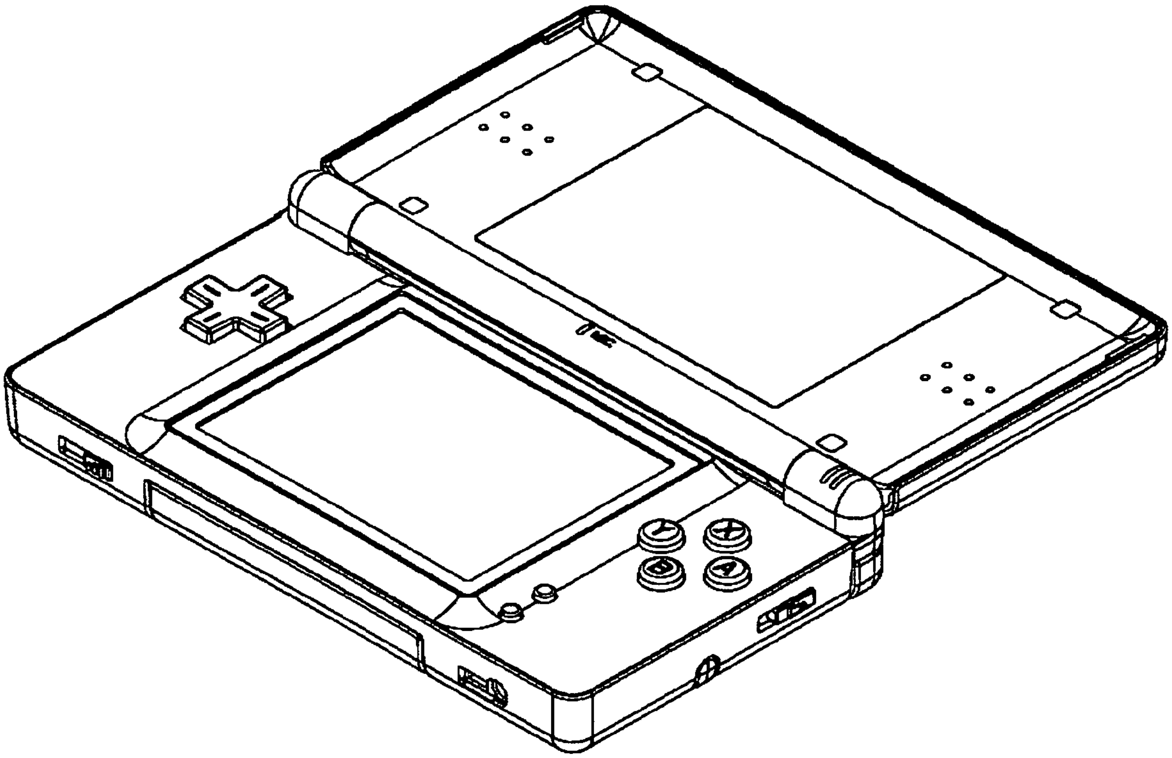
FIG. 2 is a perspective view of the game apparatus 10 according to an illustrative embodiment.

FIG. 1 is an external view of a hand-held game apparatus (hereinafter, referred to merely as a game apparatus) 10 according to an illustrative embodiment. FIG. 2 is a perspective view of the game apparatus 10. Referring to FIG. 1, the game apparatus 10 includes a first LCD (Liquid Crystal Display) 11, a second LCD 12, and a housing 13 including an upper housing 13*a* and a lower housing 13*b*. The first LCD 11 is disposed in the upper housing 13*a*, and the second LCD 12 is disposed in the lower housing 13*b*. Each of the first LCD 11 and the second LCD 12 has a resolution of 2560 dots×1920 dots. It is noted that although the LCD is used as a display in the illustrative embodiment, for example, any other displays such as a display using an EL (Electro Luminescence) may be used in place of the LCD. Also, the resolution of the display device may be at any level.

The upper housing 13*a* is formed with sound release holes 18*a* and 18*b* for releasing sound from a later-described pair of loudspeakers (30*a* and 30*b* in FIG. 3) through to the outside.

The upper housing 13*a* and the lower housing 13*b* are connected to each other by a hinge section so as to be opened or closed, and the hinge section is formed with a microphone hole 33.

The lower housing 13*b* is provided with, as input devices, a cross switch 14*a*, a start switch 14*b*, a select switch 14*c*, an A button 14*d*, a B button 14*e*, an X button 14*f*, and a Y button 14*g*. In addition, a touch panel 15 is provided on a screen of the second LCD 12 as another input device. The lower housing 13*b* is further provided with a power switch 19, and insertion openings for storing a memory card 17 and a stick 16.

The touch panel 15 is of a resistive film type. However, the touch panel 15 may be of any other type. The touch panel 15 can be operated by a finger as well as the stick 16. In the illustrative embodiment, the touch panel 15 having a resolution of 256 dots×192 dots (detection accuracy) as same as the second LCD 12 is used. However, resolutions of the touch panel 15 and the second LCD 12 do not necessarily be the same.

The memory card 17 is a storage medium storing a game program, and inserted through the insertion opening provided at the lower housing 13*b* in a removable manner.

Figure 3:
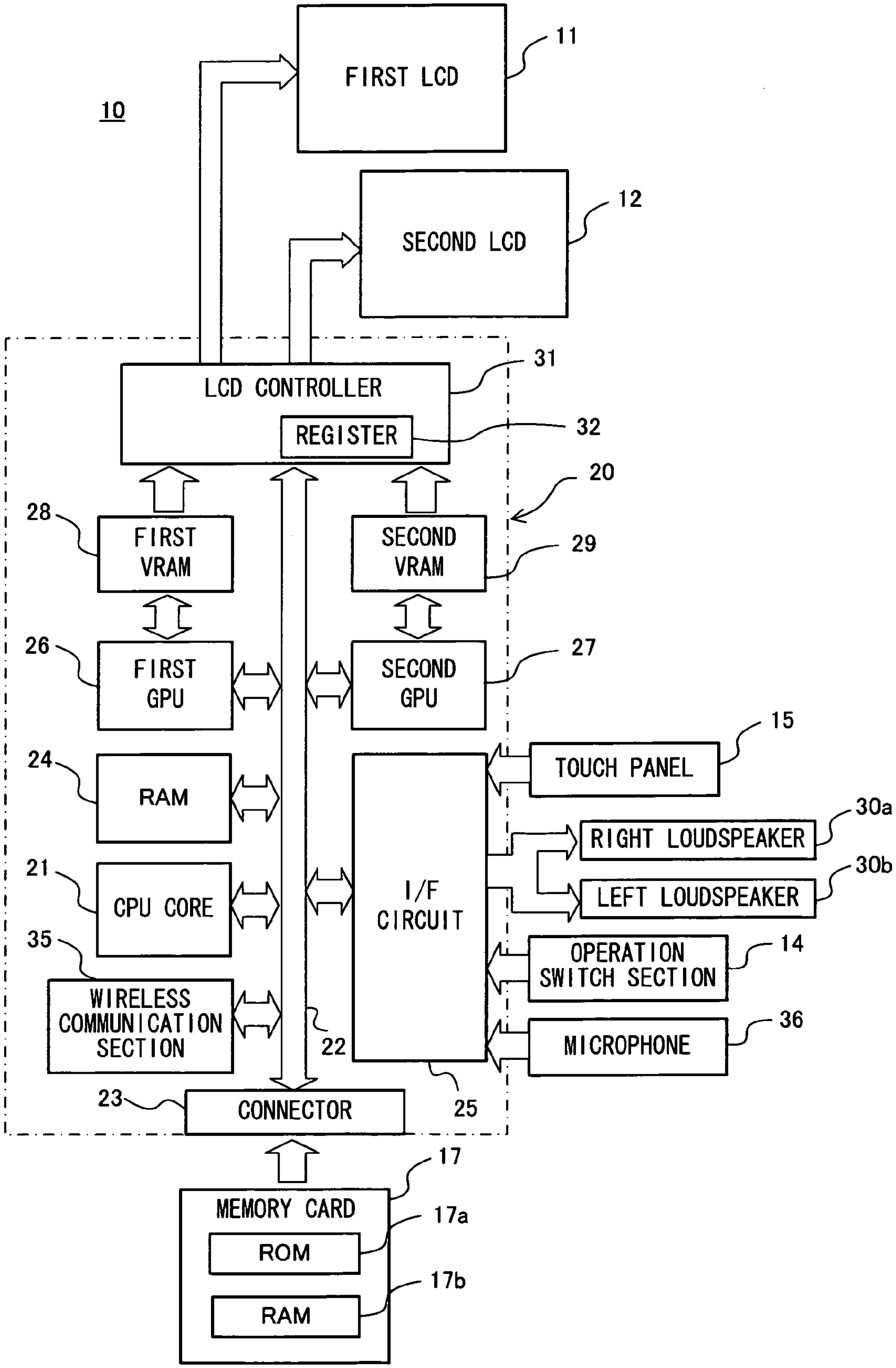
FIG. 3 is a block diagram of the game apparatus 10 according to an illustrative.

With reference to FIG. 3, the following will describe an internal configuration of the game apparatus 10.

In FIG. 3, a CPU core 21 is mounted on an electronic circuit board 20 which is to be disposed in the housing 13. The CPU core 21 is connected to a connector 23, an input/output interface circuit (shown as I/F circuit in the diagram) 25, a first GPU (Graphics Processing Unit) 26, a second GPU 27, a RAM 24, a LCD controller 31, and a wireless communication section 35 through a bus 22. The memory card 17 is connected to the connector 23 in a removable manner. The memory card 17 includes a ROM 17*a* for storing the game program, and a RAM 17*b* for storing backup data in a rewritable manner. The game program stored in the ROM 17*a* of the memory card 17 is loaded to the RAM 24, and the game program having been loaded to the RAM 24 is executed by the CPU core 21. The RAM 24 stores, in addition to the game program, data such as temporary data which is obtained by the CPU core 21 executing the game program, and data for generating a game image. The touch panel 15, the right loudspeaker 30*a*, the left loudspeaker 30*b*, the operation switch section 14 including the cross switch 14*a*, the A button 14*d*, and the like in FIG. 1, and a microphone 36 are connected to the I/F circuit 25. The right loudspeaker 30*a* and the left loudspeaker 30*b* are arranged inside the sound release holes 18*a* and 18*b*, respectively. The microphone 36 is arranged inside the microphone hole 33.

To the first GPU 26 is connected a first VRAM (Video RAM) 28, and to the second GPU 27 is connected a second VRAM 29. In accordance with an instruction from the CPU core 21, the first GPU generates a first game image based on the image data which is stored in the RAM 24 for generating a game image, and writes images into the first VRAM 28. The second GPU 27 also follows an instruction from the CPU core 21 to generate a second game image, and writes images into the second VRAM 29. The first VRAM 28 and the second VRAM 29 are connected to the LCD controller 31.

The LCD controller 31 includes a register 32. The register 32 stores a value of either 0 or 1 in accordance with an instruction from the CPU core 21. When the value of the register 32 is 0, the LCD controller 31 outputs to the first LCD 11 the first game image which has been written into the VRAM 28, and outputs to the second LCD 12 the second game image which has been written into the second VRAM 29. When the value of the register 32 is 1, the first game image which has been written into the first VRAM 28 is outputted to the LCD 12, and the second game image which has been written into the second VRAM 29 is outputted to the first LCD 11.

The wireless communication section 35 has a function of transmitting or receiving data used in a game process, and other data to or from a wireless communication section of another game apparatus.

It will be appreciated that other devices provided with a press-type touch panel that are supported by a housing may be used. Other devices may include, for example, a hand-held game apparatus, a controller of a stationery game apparatus, and a PDA (Personal Digital Assistant). Further, an input device in which a display is not provided under a touch panel may be utilized.

Figure 4:
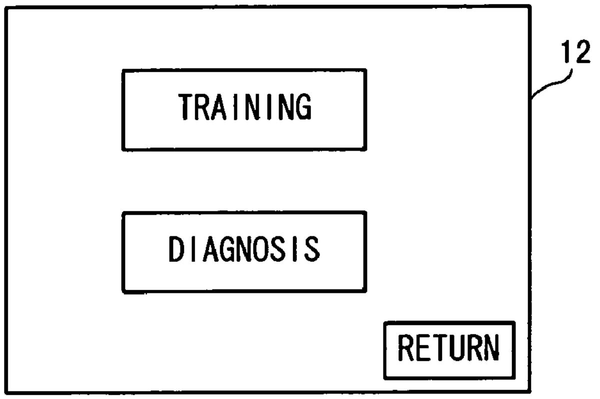
FIG. 4 illustrates an example of a game screen assumed in an illustrative embodiment.
Figure 5:
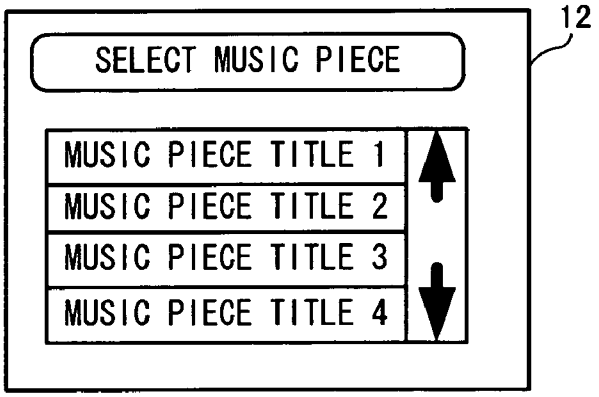
FIG. 5 illustrates an example of a game screen assumed in an illustrative embodiment.
Figure 6:
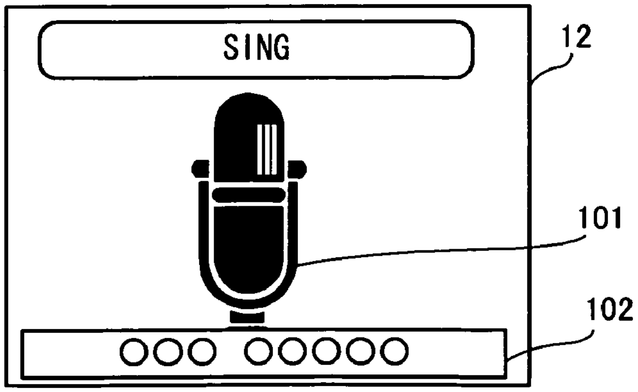
FIG. 6 illustrates an example of a game screen assumed in an illustrative embodiment.

With reference to FIGS. 4 to 6, the following will describe the outline of a game assumed in the illustrative embodiment. The game assumed in the illustrative embodiment is a karaoke game, in which a karaoke music piece is played by the game apparatus 10 and outputted from the loudspeaker 30. A player enjoys karaoke by singing to the played music piece toward the microphone 36 (the microphone hole 33). Further, the game has a function of analyzing a singing voice of the player to show a music genre suitable for the player, and a recommended music piece. The illustrative embodiment relates to this music displaying function, and thus the following will describe processing which achieves this music displaying function.

First, the karaoke game is started up, and a menu of "karaoke" is selected from an initial menu (not shown) to display a karaoke menu screen as shown in FIG. 4. On the screen, two choices, "training" and "diagnosis", and "return" are displayed. When the player selects the "training", karaoke processing for practicing karaoke is executed. On the other hand, when the player selects the "diagnosis", music displaying processing, which achieves the above music displaying function, is executed. When the player selects the "return", the above initial menu is returned to.

More specifically, when the player selects the "diagnosis" from the menus in FIG. 4, a music piece list screen is displayed as shown in FIG. 5. The player selects a desired music piece from the screen. After the selection, a screen, which includes a microphone 101, lyrics 102, and the like, is displayed as shown in FIG. 6, and the selected music piece is started to play. When the player sings the music piece toward the microphone 36, analysis processing for a singing voice inputted to the microphone 36 is executed. More specifically, data indicating a voice volume value (hereinafter, referred to as voice volume value data) and data concerning pitch (hereinafter, referred to as pitch data) are generated from the singing voice of the player. Based on both pieces of data, a parameter indicating a characteristic of a singing way of the player (hereinafter, referred to as a singing voice parameter) is calculated. For example, a parameter indicating a characteristic such as a musical interval sense, a rhythm, a vibrato, and the like is calculated.

Then, the singing voice parameter and a music piece parameter stored in advance in the memory card 17 (which is read in the RAM 24 when the game processing is executed) are compared with each other. Here, the music piece parameter is generated in advance by analyzing music piece data. The music piece parameter indicates not only a characteristic of a music piece but also which singing voice parameter of a singing voice the music piece is suitable for. Thus, as a tendency of a value of the singing voice parameter is more similar to that of the music piece parameter, the music piece is determined to be more suitable for the singing voice. Such a similarity is determined, and a music piece suitable for the singing voice (a singing way, a characteristic of singing) of the player is searched for. In the illustrative embodiment, Pearson's product-moment correlation coefficient is used for determining a similarity. The search result is displayed as a "recommended music piece". Further, in the illustrative embodiment, a music genre suitable for the singing way of the player (a recommended genre) is also displayed. As a result, when the player finishes singing the music piece, for example, phrases, "A genre suitable for you is OOOO. A recommended music piece is ΔΔΔΔ" are displayed.

As described above, in the game of the illustrative embodiment, the player sings during the "diagnosis", and the processing of displaying a music piece and a music genre, which are suitable for the singing voice of the player, is executed.

Figure 7:
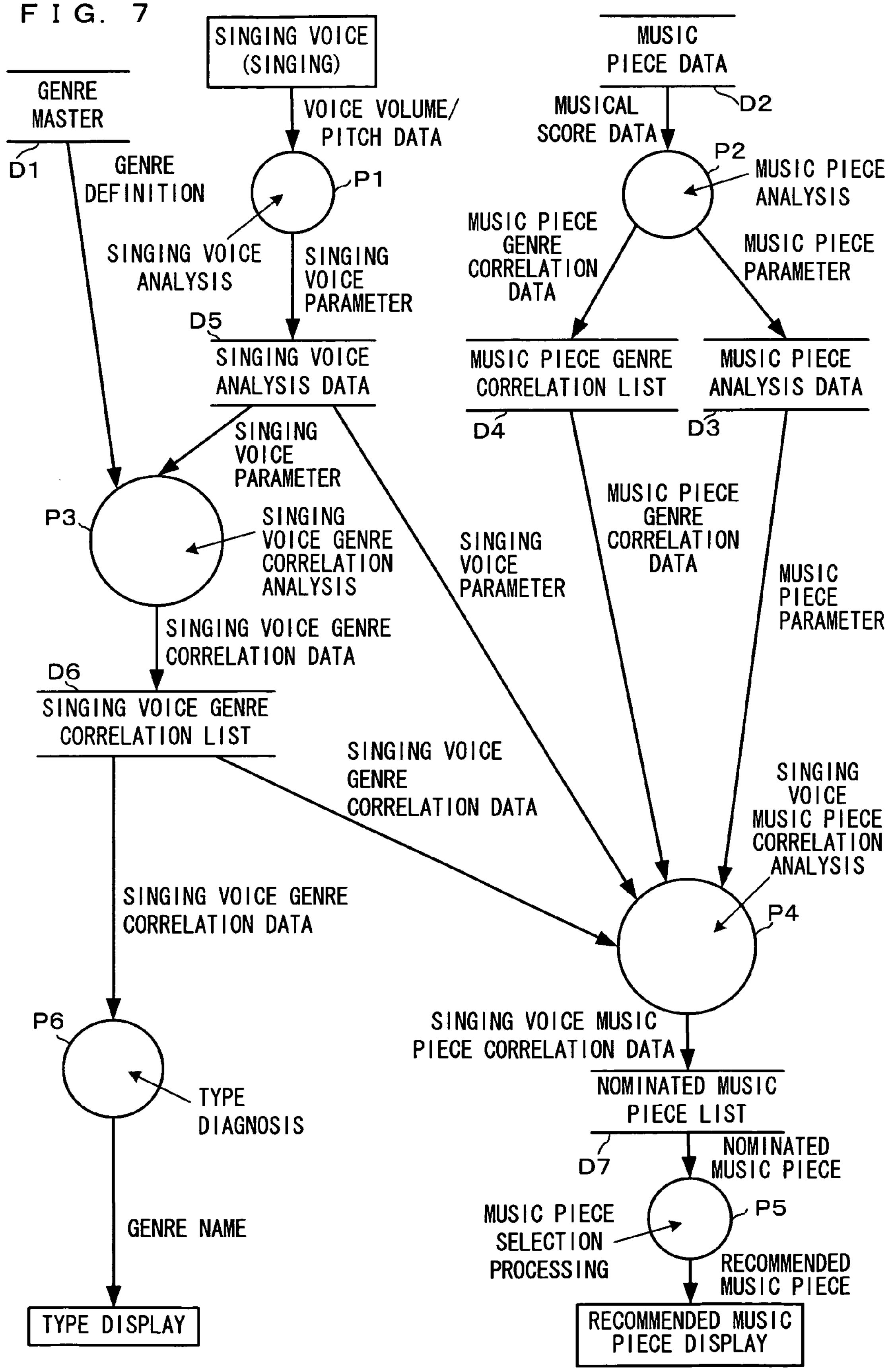
FIG. 7 is a view for explaining the outline of music displaying processing according to an illustrative embodiment.

The following will describe the outline of the above music displaying processing. FIG. 7 is a view for explaining the outline of the music displaying processing according to the illustrative embodiment. Here, notation of FIG. 7 is explained. In FIG. 7, an elements indicated by a box indicate an information source or an information exit. It means an external information source or a place to which information is outputted. An element indicated by a circle indicates a process (for processing input data, and outputting resultant data). An element indicated by two parallel lines indicates a data store (a storage area of data). An element indicated by an arrow indicates a data flow showing a transfer pathway of data.

In the illustrative embodiment, the memory card 17, which stores contents corresponding to music piece data (D2), music piece analysis data (D3), and a music piece genre correlation list (D4) in FIG. 7, is distributed as a game product to the market. The memory card 17 is inserted into the game apparatus 10, and the game processing is executed. Thus, music piece analysis (P2) in FIG. 7 is performed in advance prior to shipment of the product. The music piece analysis data (D3), and the music piece genre correlation list (D4) are produced, and stored as a part of game data in the memory card 17.

More specifically, in the music piece analysis (P2), musical score data in the music piece data (D2) is inputted for performing later-described analysis processing. As an analysis result, the music piece analysis data (D3) and the music piece genre correlation list (D4) are outputted. In the music piece analysis data is stored a music piece parameter which indicates a musical interval sense, a rhythm, a vibrato, and the like of an analyzed music piece. In the music piece genre correlation list is stored music piece genre correlation data which indicates a similarity between a music piece and a genre. For example, for a music piece, 80 points and 50 points are stored for a genre of "rock" and a genre of "pop", respectively. This data will be described in detail later.

In addition, a genre master (D1) is produced in advance by a game developer, or the like, and stored in the memory card 17. The genre master is defined so as to associate a genre of a music piece used in the illustrative embodiment with a characteristic of a singing voice suitable for the genre.

The following will describe the outline of the music displaying processing which is executed when the player selects the "diagnosis" from the above menus in FIG. 4. In this processing, the above processing (an operation of the player) is performed, and a singing voice of the player is inputted to the microphone 36. Voice volume data and pitch data are produced from the singing voice, and singing voice analysis (P1) is performed based on these data. Then, as an analysis result, a singing voice parameter is outputted, and stored as singing voice analysis data (D5). The singing voice parameter is a parameter obtained by evaluating the singing voice of the player in view of strength, a musical interval sense, a rhythm, and the like. The singing voice parameter basically includes items common to those of the music piece parameter. The singing voice parameter will be described in detail later.

Next, the singing voice analysis data (D5) and the genre master (D1) are inputted, and singing voice genre correlation analysis (P3) is performed for analyzing which music genre is suitable for a singing voice of a singing person. In this analysis, a correlation value between the inputted singing voice and a genre (a value indicating a degree of similarity) is calculated. Then, singing voice genre correlation data, which is a result of this analysis, is stored as a singing voice genre correlation list (D6).

Subsequently, singing voice music piece correlation analysis (P4) is performed. In this analysis, the music piece analysis data (D3), the music piece genre correlation list (D4), the singing voice analysis data (D5), and the singing voice genre correlation list (D6) are inputted. Then, based on these data and lists, correlation values between the singing voice of the player and music pieces stored in the game apparatus 10 are calculated. Only correlation values which are equal to or larger than a predetermined value are extracted from the calculated values to produce a nominated music piece list (D7).

Next, music piece selection processing (P5) using the nominated music piece list as an input is performed. In this processing, a music piece is selected randomly as a recommended music piece from the nominated music piece list. The selected music piece is shown as a recommended music piece to the player.

Further, type diagnosis (P6) using the singing voice genre correlation list (D6) as an input is performed. In this diagnosis, a genre having the highest correlation value is selected from the singing voice genre correlation data, and its genre name is outputted. The genre name is displayed as a result of the type diagnosis together with the recommended music piece.

Figure 8A:
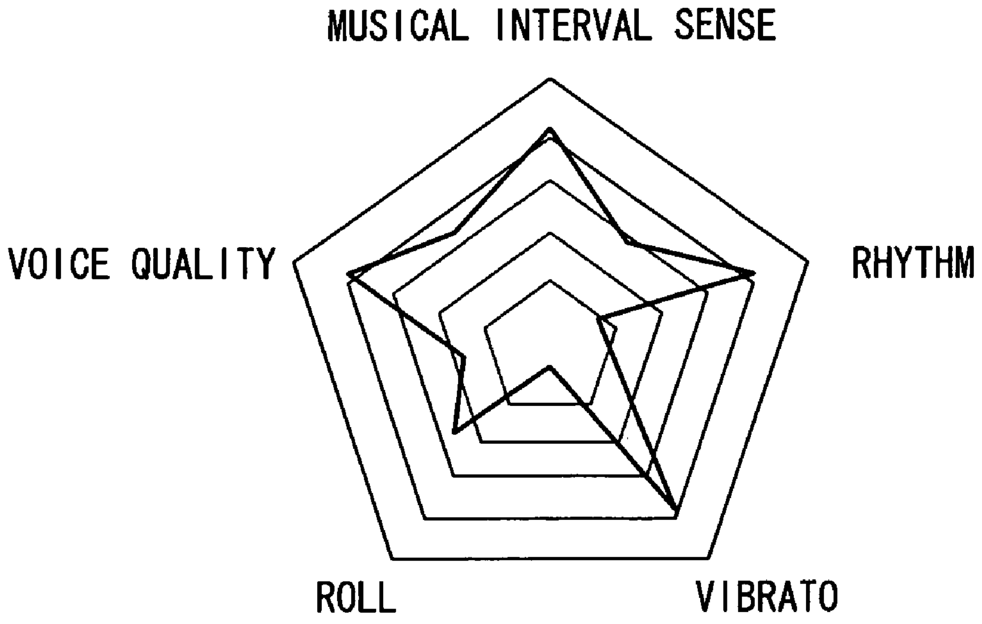
FIG. 8A is a view for explaining the outline of the music displaying processing according to an illustrative embodiment.
Figure 8B:
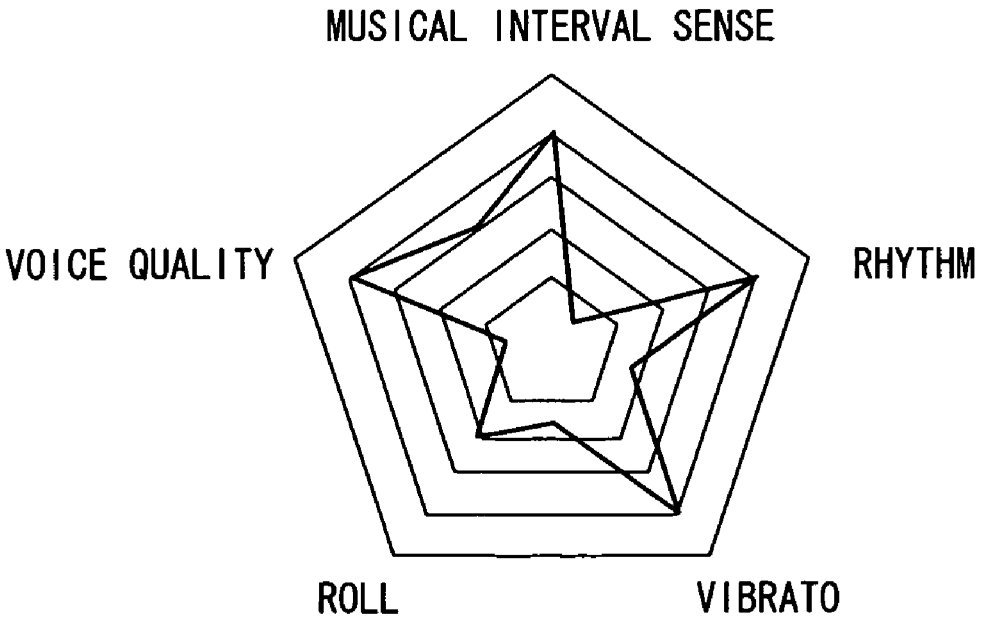
FIG. 8B is a view for explaining the outline of the music displaying processing according to an illustrative embodiment.

As described above, in the illustrative embodiment, the musical score data is analyzed for producing data (a music piece parameter) which indicates a characteristic of a music piece. Also, the singing voice of the player is analyzed for producing data (a singing voice parameter) which indicates a characteristic of a singing way of the player. FIGS. 8A and 8B are radar charts showing this data. FIG. 8A shows contents corresponding to the music piece parameter, and FIG. 8B shows contents corresponding to the singing voice parameter. Processing is performed so that a similarity between this analysis data is calculated, that is, patterns of the charts of FIGS. 8A and 8B are compared to calculate a similarity between these patterns. Based on the similarity, a genre and a music piece, which are suitable for the singing voice of the player, are shown (as the similarity is higher, the music piece is more suitable of the singing voice of the player). Thus, a music piece and a genre, which are suitable for the player to sing, can be shown, and enjoyment of the karaoke game can be enhanced.

The following will describe various data used in the illustrative embodiment. The above singing voice parameter and the music piece parameter, which are analysis results of voice and a music piece in the music displaying processing of the illustrative embodiment, will be now described. The singing voice parameter is obtained by dividing a characteristic of the singing voice into a plurality of items and quantifying each item. In the illustrative embodiment, 10 parameters shown in the table in FIG. 9 are used as the singing voice parameters.

Figure 9:
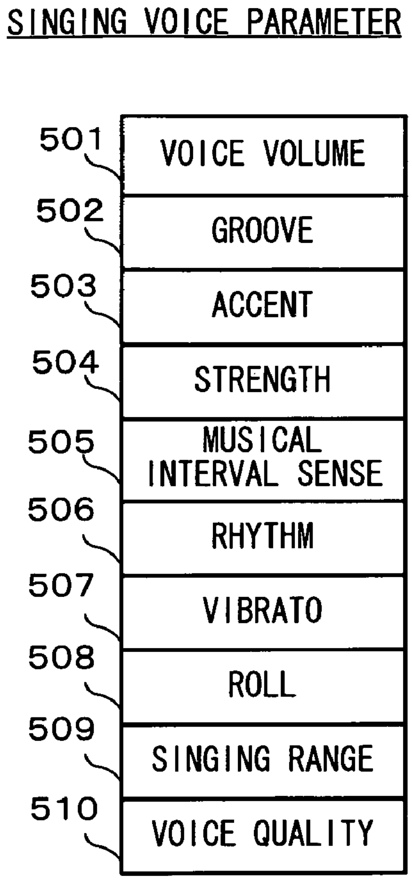
FIG. 9 illustrates an example of singing voice parameters.

In FIG. 9, a voice volume 501 is a parameter which indicates a volume of a singing voice. As a sound volume inputted to the microphone 36 increases, a value of the voice volume 501 becomes large.

Figure 10:
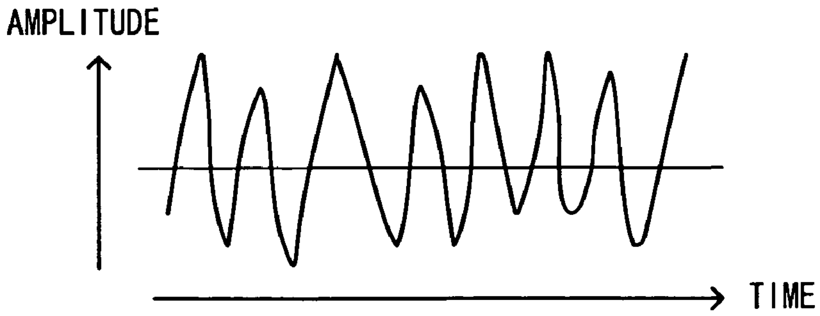
FIG. 10 is an illustrative view for explaining "groove"

A groove 502 is a parameter obtained by evaluating whether or not an accent (a voice volume equal to or larger than a predetermined volume) occurs for each period of a half note. For example, in the case where a voice is represented by a waveform as shown in FIG. 10, the groove 502 is obtained by evaluating whether or not amplitude having a value equal to or larger than a predetermined value (or a voice volume equal to or larger than a predetermined volume) occurs at a period of a half note. When a voice having a voice volume equal to or larger than a predetermined value for each period of a half note is inputted, the voice is considered to have a good groove, and a value of the groove 502 becomes large.

An accent 503 is a parameter obtained, similarly as the groove 502, by observing and evaluating how frequently a voice volume (a wave of the voice volume) is changed. Different from the groove 502, the observation is performed for each period of two bars.

A strength 504 is a parameter obtained, similarly as the groove 502, by observing and evaluating how frequently a voice volume (a wave of the voice volume) is changed. Different from the groove 502, the observation is performed for each period of an eighth note.

A musical interval sense 505 is a parameter obtained by evaluating whether or not the player sings with correct pitch with respect to each musical note of a melody part of a musical score. As a number of musical notes, with respect to which the player sings with correct pitch, increases, a value of the musical interval sense 505 becomes large.

A rhythm 506 is a parameter obtained by evaluating whether or not the player sings in a rhythm which matches a timing of each musical note of a musical score. When the player sings correctly at a start timing of each musical note, a value of the rhythm 506 becomes large. In other words, as a voice volume equal to or larger than a predetermined value is inputted at a start timing of a musical timing, the value of the rhythm 506 becomes large.

A vibrato 507 is a parameter obtained by evaluating how frequently a vibrato occurs during singing. As a total time, for which a vibrato occurs until singing of a music piece is finished, is longer, a value of the vibrato 507 becomes large.

A roll (kobushi which is a Japanese term) 508 is a parameter obtained by evaluating how frequently a roll occurs during singing. When a voice changes from a low pitch to a correct pitch within a constant time period from the beginning of singing (from a start timing of a musical note), a value of the roll 508 becomes large.

A singing range 509 is a parameter obtained by evaluating a pitch which the player is best at. In other words, the singing range 509 is a parameter obtained by evaluating a pitch of a voice. As a pitch with which the player sings with the greatest voice volume is higher, a value of the singing range 509 becomes large. The pitch with which the player sings with the greatest voice volume is used because it is considered that the player can output a loud voice with a pitch which the player is good at.

A voice quality 510 is a parameter obtained by evaluating a brightness of a voice (whether or not the voice is a carrying voice or an inward voice). The parameter is calculated from data of a voice spectrum. When a voice has more high-frequency components, a value of the voice quantity 10 becomes large.

The following will describe the music piece parameter. The music piece parameter is a parameter obtained by analyzing the musical score data, and quantifying each item which indicates a characteristic of a music piece. The music piece parameter is to be compared with the singing voice parameter for each item. The music piece parameter implies that "this music piece is suitable for a person with a singing voice having such a singing voice parameter". In the illustrative embodiment, 5 parameters shown in the table in FIG. 11 are used as the music piece parameters.

Figure 11:
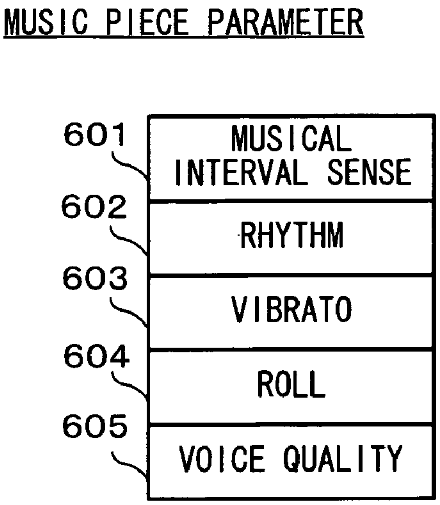
FIG. 11 illustrates an example of music piece parameters.

In FIG. 11, a musical interval sense 601 is a parameter obtained by evaluating a change in musical intervals in a music piece and a level of difficulty of singing the music piece. When there are many portions in a musical score, in which musical intervals are changed substantially, the music piece is evaluated to be difficult to sing.

A rhythm 602 is a parameter obtained by evaluating a rhythm of a music piece and ease of singing the music piece.

A vibrato 603 is a parameter obtained by evaluating ease of putting vibratos in a music piece.

A roll 604 is a parameter obtained by evaluating ease of putting rolls in a music piece.

A voice quality 605 is a parameter obtained by evaluating which voice quality of a person a music piece is suitable for.

The above parameters are calculated from the voice of the player and the musical score data of the music piece. In the illustrative embodiment, processing is performed so that as a similarity between the singing voice parameter and the music piece parameter is higher, the music piece may be determined to be more suitable for the singing voice of the player, and shown as a recommended music piece.

Figure 12:
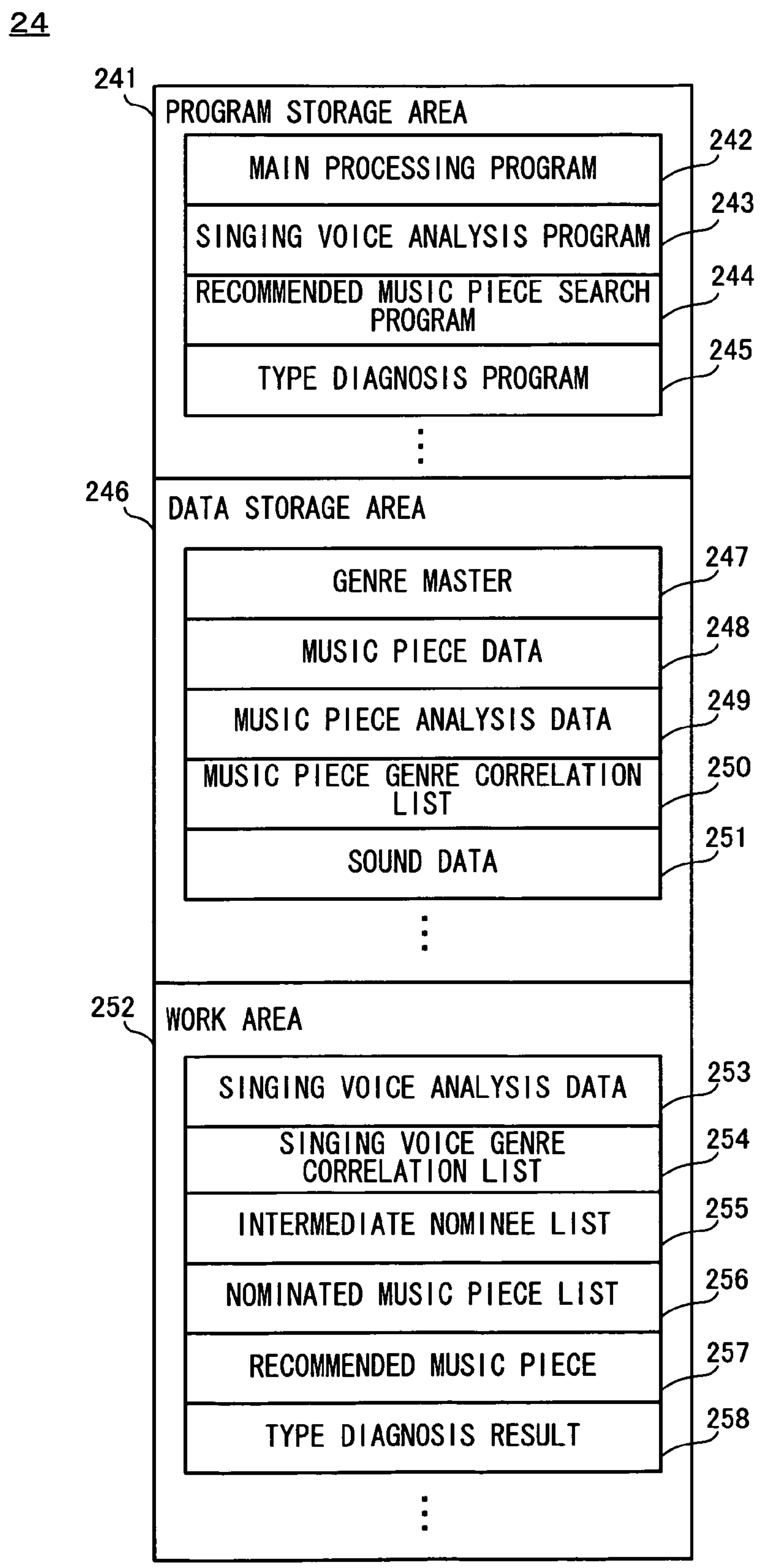
FIG. 12 illustrates a memory map in which a memory space of a RAM 24 in FIG. 3 is diagrammatically shown.

The following will describe data which is stored in the RAM 24 when the game processing is executed. FIG. 12 illustrates a memory map of the RAM 24 in FIG. 3. As shown in FIG. 12, the RAM 24 includes a program storage area 241, a data storage area 246, and a work area 252. Data in the program storage area 241 and the data storage area 246 are data obtained by copying therein data which is stored in advance in a ROM 17*a* of the memory card 17. For convenience of explanation, each data will be described in a form of a table data. However, this data does not need to be stored in a form of a table data, and contents corresponding to the table may be stored in a game program.

In the program storage area 241 is stored a game program executed by the CPU core 21. The game program includes a main processing program 242, a singing voice analysis program 243, a recommended music piece search program 244, a type diagnosis program 245, and the like.

The main processing program 242 is a program corresponding to processing of a later-described flow chart in FIG. 29. The singing voice analysis program 243 is for causing the CPU core 21 to execute processing for analyzing the singing voice of the player, and the recommended music piece search program 244 is for causing the CPU core 21 to execute processing for searching for a music piece suitable for the singing voice of the player. The type diagnosis program 245 is for causing the CPU core 21 to execute processing for determining a music genre suitable for the singing voice of the player.

In the data storage area 246 are stored data such as a genre master 247, music piece data 248, music piece analysis data 249, a music piece genre correlation list 250, sound data 251.

The genre master 247 is data corresponding to the genre master D1 shown in FIG. 7. In other words, the genre master 247 is data in which music genres and a characteristic of a singing voice parameter for each music genre are defined. Based on the genre master 247 and later-described singing voice analysis data 253, type diagnosis is performed.

FIG. 13 illustrates an example of a data structure of the genre master 247. The genre master 247 includes a genre name 2471, and a singing voice parameter definition 2472. The genre name 2471 is data which indicates a music genre used in the illustrative embodiment. The singing voice parameter definition 2472 is a parameter obtained by defining a characteristic of a singing voice for each music genre, and a predetermined value is defined and stored therein for each of the ten singing voice parameters described using FIG. 9.

Referring back to FIG. 12, the music piece data 248 is data concerning each music piece used in the game processing of the illustrative embodiment, which corresponds to the music piece data D2 in FIG. 7. FIG. 14 illustrates an example of a data structure of the music piece data 248. The music piece data 248 includes a music piece number 2481, bibliographical data 2482, and musical score data 2483. The music piece number 2481 is for uniquely identifying each music piece. The bibliographical data 2482 is data which indicates bibliographical items such as a title of each music piece, and the like. The musical score data 2483 is basic data for music piece analysis processing as well as data used for playing (reproducing) each music piece. The musical score data 2483 includes data concerning a musical instrument used for each part of a music piece, data concerning a tempo and a key of a music piece, and data which indicates each musical note.

Referring back to FIG. 12, the music piece analysis data 249 is data obtained by analyzing the musical score data 2483. The music piece analysis data 249 corresponds to the music piece analysis data D3 described above using FIG. 7. FIG. 15 illustrates an example of a data structure of the music piece analysis data 249. The music piece analysis data 249 includes a music piece number 2491, and a music piece parameter 2492. The music piece number 2491 is data corresponding to the music piece number 2481 of the music piece data 248. The music piece parameter 2492 is a parameter for indicating a characteristic of a music piece as described above using FIG. 11.

Referring back to FIG. 12, the music piece genre correlation list 250 is data corresponding to the music piece genre correlation list D4 in FIG. 7, and data which indicates a similarity between a music piece and a genre is stored therein. FIG. 16 illustrates an example of a data structure of the music piece genre correlation list 250. The music piece genre correlation list 250 includes a music piece number 2501, and a genre correlation value 2502. The music piece number 2501 is data corresponding to the music piece number 2481 of the music piece data 248. The genre correlation value 2502 is a correlation value between each music piece and a music genre in the illustrative embodiment. It is noted that in FIG. 16, the correlation values range from −1 to +1. As a correlation value is close to +1, the correlation value indicates that a degree of correlation is high. The same is true for later-described correlation values.

Referring back to FIG. 12, in the sound data 251 is stored sound data such as data of sound of each musical instrument used in the game, and the like. In other words, in the game processing, sound of a musical instrument is read from the sound data 251 based on the musical score data 2483 as appropriate. The sound of the musical instrument is outputted from the loudspeaker 30 to play (reproduce) a karaoke music piece.

In the work area 252 various data is stored which is used temporarily in the game processing. More specifically, work area 252 stores the singing voice analysis data 253, a singing voice genre correlation list 254, an intermediate nominee list 255, a nominated music piece list 256, a recommended music piece 257, a type diagnosis result 258, and the like.

The singing voice analysis data 253 is data produced as a result of executing analysis processing for the singing voice of the player. The singing voice analysis data 253 corresponds to the singing voice analysis data D5 in FIG. 7. FIG. 17 illustrates an example of a data structure of the singing voice analysis data 253. In the singing voice analysis data 253, the contents of the singing voice parameters described above using FIG. 9 are stored as singing voice parameters 2532 so as to be associated with parameter names 2531. Thus, the detailed description of the contents of this data will be omitted.

The singing voice genre correlation list 254 is data corresponding to the singing voice genre correlation list D6 in FIG. 7, which indicates a degree of correlation between the singing voice of the player and a music genre. FIG. 18 illustrates an example of a data structure of the singing voice genre correlation list 254. The singing voice genre correlation list 254 includes a genre name 2541, and a correlation value 2542. The genre name 2541 is data that indicates a music genre. The correlation value 2542 is data that indicates a correlation value between each genre and the singing voice of the player.

The intermediate nominee list 255 is data used during processing for searching for music pieces, which may be nominated as a recommended music piece to be shown to the player. FIG. 19 illustrates an example of a data structure of the intermediate nominee list 255. The intermediate nominee list 255 includes a music piece number 2551, and a correlation value 2552. The music piece number 2551 is data corresponding to the music piece number 2481 of the music piece data 248. The correlation value 2552 is a correlation value between a music piece indicated by the music piece number 2551 and the singing voice of the player.

The nominated music piece list 256 is data concerning music pieces nominated for a recommended music piece to be shown to the player. The nominated music piece list 256 is produced by extracting, from the intermediate nominee list 255, data having correlation values 2552 equal to or larger than a predetermined value. FIG. 20 illustrates an example of a data structure of the nominated music piece list 256. The nominated music piece list 256 includes a music piece number 2561, and a correlation value 2562. The contents of each item are similar to those of the intermediate nominee list 255, and hence the description thereof will be omitted.

The recommended music piece 257 stores a music piece number of a "recommended music piece" which is a result of later-described recommended music piece search processing.

The type diagnosis result 258 stores a music genre name which is a result of later-described type diagnosis processing.

Figure 21:
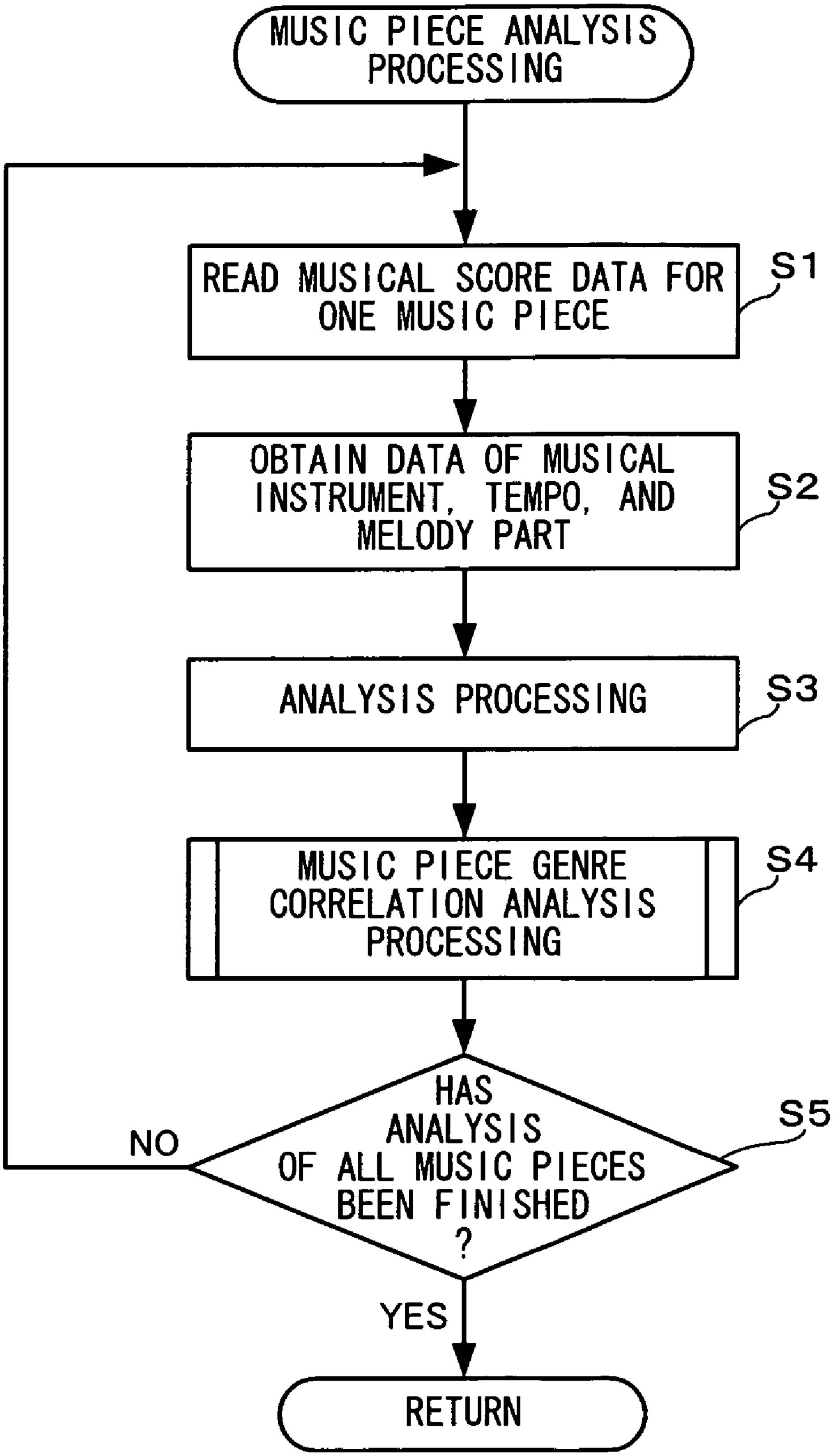
FIG. 21 is an illustrative flow chart showing music piece analysis processing.

With reference to FIGS. 21 to 34, the following will describe a procedure of the game processing executed by the game apparatus 10. First, processing of producing the music piece analysis data 249 and the music piece genre correlation list 250, which is executed prior to actual game play by the player (or prior to shipment of a product) as described above, will be described. FIG. 21 is a flow chart of music piece analysis processing (corresponding to the music piece analysis P2 in FIG. 7). As shown in FIG. 21, at a step S1, musical score data 2483 for one music piece is read from the music piece data 248.

Next, at a step S2, data of a musical instrument, a tempo, and musical notes of a melody part are obtained from the read musical score data 2483.

Next, at a step S3, processing is executed for analyzing data obtained from the above musical score data 2483 to calculate an evaluation value of each item of the music piece parameter shown in FIG. 11. The following will describe each item of the music piece parameter shown in FIG. 11. It is noted that in an alternative illustrative embodiment, another parameter may be included for analysis, and the data obtained at the step S2 is not limited to the above three items.

Concerning an evaluation value of the musical interval sense 601, processing is executed for evaluating a change in musical intervals, which occurs in a musical score, to calculate the evaluation value. More specifically, the following processing is executed.

Figure 22A:
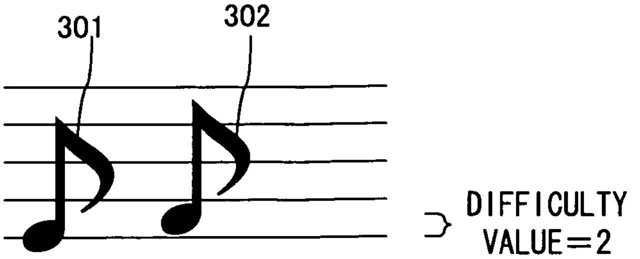
FIG. 22A is a view showing an example of setting of a difficulty value used for evaluating a musical interval sense.
Figure 22B:
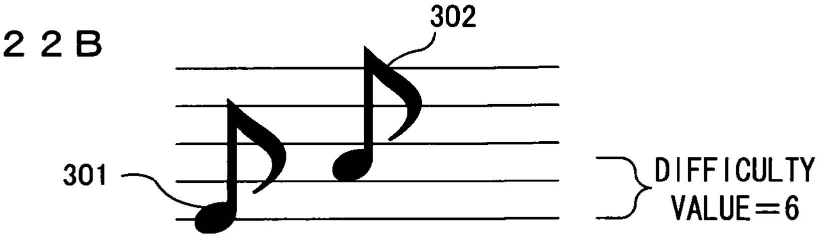
FIG. 22B is a view showing an example of setting of a difficulty value used for evaluating a musical interval sense.
Figure 22C:
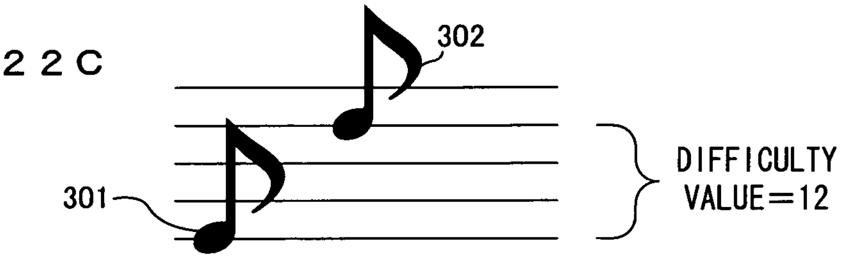
FIG. 22C is a view showing an example of setting of a difficulty value used for evaluating a musical interval sense.

A difficulty value is set to a musical interval between any two adjacent musical notes. For example, in the case where a musical interval between two adjacent musical notes is large, it is difficult to change pitch during singing as indicated by a musical score, and thus a high difficulty value is set thereto. FIGS. 22A to 22C are views in which as an example of setting of the difficulty value, difficulty values proportional to magnitudes of musical intervals are set. A difficulty value for a semitone is regarded as 1, and in FIG. 22A, a musical interval between a musical note 301 and a musical note 302 is a tone (two semitones). Thus, a difficulty value of this musical interval is set as 2. Since a musical interval between two adjacent musical notes 301 and 302 is three tones in FIG. 22B, a difficulty value thereof is set as 6. Similarly, since a musical interval between two adjacent musical notes 301 and 302 is six tones in FIG. 22C, a difficulty value thereof is set as 12. It is noted that the difficulty value is not necessarily proportional to the magnitude of a musical interval, and may be set in another setting manner.

Next, an occurrence probability of each musical interval in the melody part is calculated. Then, an occurrence difficulty value is calculated for each musical interval by using the following equation:

occurrence difficulty value=occurrence probability×difficulty value of musical interval.

Next, the occurrence difficulty value of each musical interval is totaled to calculate a total difficulty value. Then, an evaluation value is calculated by using the following equation:

evaluation value=total difficulty value×α.

Here, α is a predetermined coefficient (it is the same below). The evaluation value is stored as an evaluation value of the musical interval sense 601.

Figure 23:
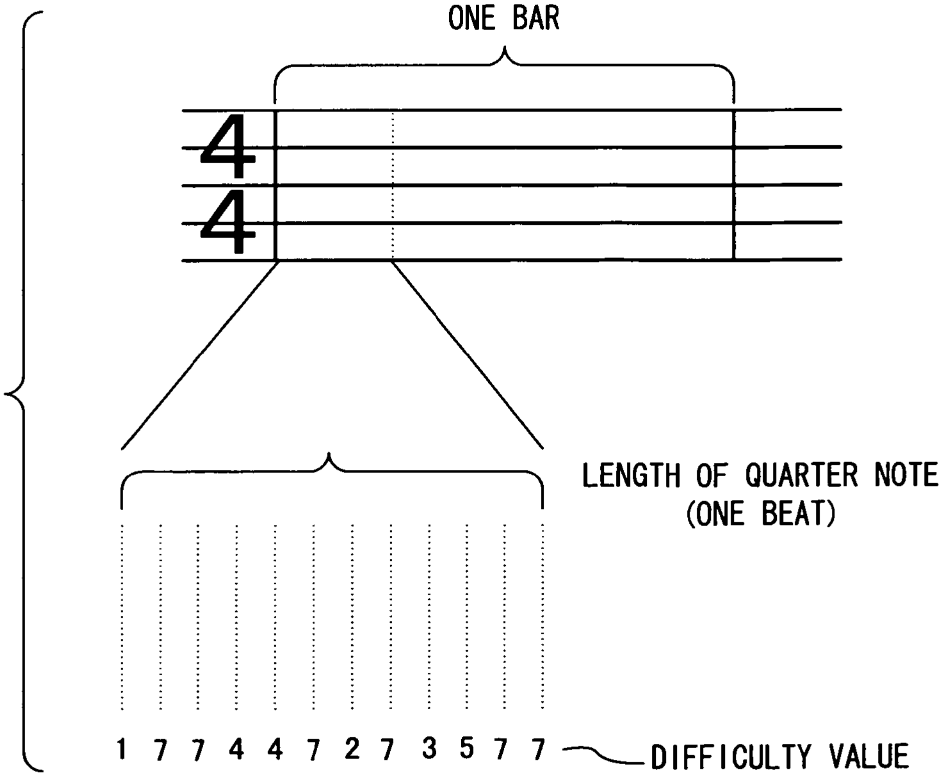
FIG. 23 is a view showing an example of setting of difficulty values used for evaluating a rhythm.

Concerning an evaluation value of the rhythm 602, the following processing is executed to calculate the evaluation value. One beat (a length of a quarter note) is equally divided into twelve parts, and a difficulty value is set to each position or each of the twelve parts within the beat. FIG. 23 is a view showing an example of setting of difficulty values. As shown in FIG. 23, a difficulty value for the head of a beat is set as the easiest difficulty value, 1, and a difficulty value for a position in the beat distant from the head thereof by an eighth note is set as the second easiest difficulty value, 2. The other positions in the beat are difficult to sing, and thus higher difficulty values are set thereto.

Next, an occurrence probability of a musical note of the melody part at each position within the beat is calculated. In addition, for each position within the beat, a value (a within-beat difficulty value) is calculated by multiplying the occurrence probability by the difficulty value which is set to the position within the beat. Further, the calculated within-beat difficulty values are totalized to calculate a within-beat difficulty total value. Then, an evaluation value is calculated by using the following equation:

evaluation value=within-beat difficulty total value×α.

The evaluation value is stored as an evaluation value of the rhythm 602.

An evaluation value of the vibrato 603 is calculated as follows. Sound production times of musical notes of the melody part, which have time lengths equal to or longer than 0.55 seconds, are totalized to calculate a sound production time total value. The musical note having the time length equal to or longer than 0.55 seconds is considered to be suitable for a vibrato, and an evaluation value of the vibrato 603 is calculated by using the following equation:

evaluation value=sound production time total value×α.

The evaluation value is stored as an evaluation value of the vibrato 603.

The following processing is executed to calculate an evaluation value of the roll 604. Similarly as the musical interval sense, a unit which sets a semitone as 1 is used, and a value (a musical interval value) is set to a musical interval between any two adjacent musical notes. A higher numerical value is set to a larger musical interval.

Next, an occurrence probability of each musical interval in the melody part is calculated. For each musical interval, a musical interval occurrence value is calculated by using the following equation:

musical interval occurrence value=occurrence probability×musical interval value of each musical interval.

Next, the calculated musical interval occurrence value of each musical interval is totalized to calculate a total musical interval occurrence value. An evaluation value is calculated by using the following equation:

evaluation value=total musical interval occurrence value×α.

Further, an average of this evaluation value and the evaluation value of the vibrato 603 is calculated, and the calculated average value is stored as an evaluation value of the roll 604.

Figures 24, 25:
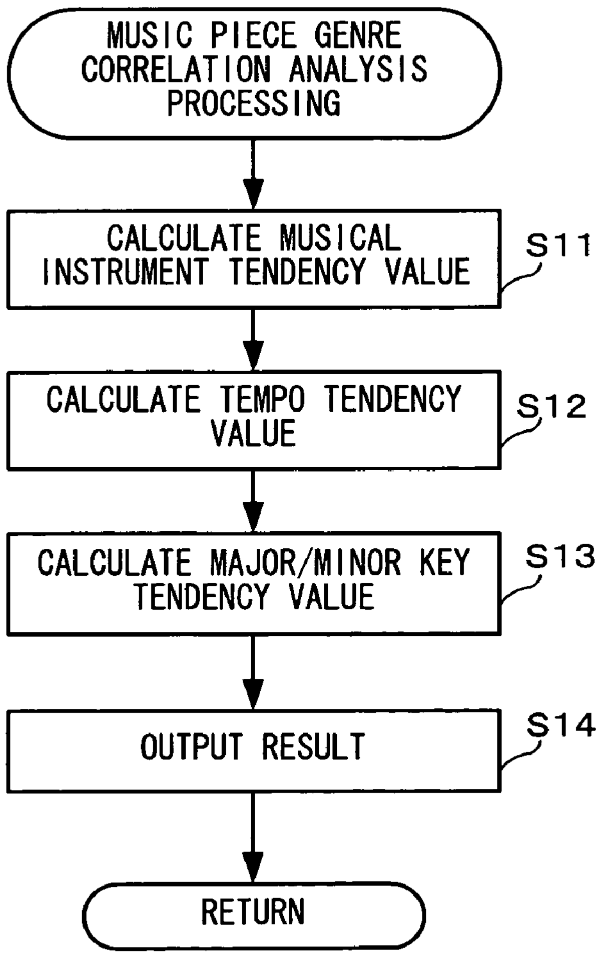
FIG. 24 is a view showing an example of a voice quality value used for evaluating a voice quality.
FIG. 25 is an illustrative flow chart showing in detail music piece genre correlation analysis processing shown at a step S4 in FIG. 21.

Next, an evaluation value of the voice quality 605 is calculated as follows. A value corresponding to a voice quality (a voice quality value) is set for each musical instrument used for a music piece. FIG. 24 is a view showing an example of setting of voice quality values. As shown in FIG. 24, "1", "2", and "9" are set as voice quality values for an electric guitar, a synth lead and a trumpet, and a flute, respectively. Here, brightness of a voice is indicated by a number of 1 to 10, and "1" indicates that a voice is the brightest. Thus, in FIG. 24, the electric guitar, the synth lead, and the trumpet are indicated to be suitable for a bright voice, and the flute is indicated to be suitable for a non-bright voice, for example, a tender voice or a soft voice.

Next, based on the above voice quality values, the voice quality value for each musical instrument used for the music piece is totaled to calculate a total voice quality value. Then, an evaluation value is calculated by using the following equation:

evaluation value=total voice quality value×α.

The evaluation value is stored as an evaluation value of the voice quality 605.

The above analysis processing is executed to calculate the music piece parameter for a music piece. The music piece parameter is additionally outputted to the music piece analysis data 249 so as to be associated with the music piece which is an analyzed object.

Referring back to FIG. 21, next, at step S4, later-described music piece genre correlation analysis processing is executed. In this processing, a similarity between a music piece and a genre is calculated, and its result is outputted to the music piece genre correlation list 250.

Next, at a step S5, whether or not all of music pieces have been analyzed is determined. When there are music pieces which have not been analyzed yet (NO at step S5), step S1 is returned to, and a music piece parameter for the next music piece is calculated. On the other hand, when analysis of all of the music pieces has been finished (YES at step S5), the music piece analysis processing is terminated.

The following will describe production of the aforementioned music piece genre correlation list 250. FIG. 25 is a flow chart showing in detail the music piece genre correlation analysis processing shown at step S4. In this processing, for one music piece, the following three tendency values are derived for each genre.

At step S11, a musical instrument tendency value is calculated. The musical instrument tendency value is used for estimating, from a type of a musical instrument used for a music piece, which genre the music piece is suitable for. In other words, the musical instrument tendency value is for taking into consideration a musical instrument which is frequently used for each genre.

In calculating the musical instrument tendency value, a tendency value, which indicates how frequently a musical instrument is used for each genre, is set for each of musical instruments used for music pieces in the illustrative embodiment. FIG. 26 illustrates an example of setting of the tendency values. Here, a tendency value ranges from 0 to 10, and a higher value indicates that a musical instrument is used more frequently (the same is true for the later-described other two types of tendency values). As shown in FIG. 26, for example, for a violin, values of “4” and “1” are set for pop and rock, respectively. Thus, in the case where a violin is used for a music piece, the music piece is evaluated to have a high degree of correlation with pop and a low degree of correlation with rock.

Based on setting of such a tendency value and a type of a musical instrument used for a music piece which is a processed object, a musical instrument tendency value is calculated for each genre.

Referring back to FIG. 25, next, at a step S12, a tempo tendency value is calculated. The tempo tendency value is used for estimating, from a tempo of a music piece, which genre the music piece is inclined to. For example, it is estimated that a music piece having a slow tempo is inclined to ballade rather than rock and a music piece having a fast tempo is inclined to rock rather than ballade. In other words, the tempo tendency value is for taking into consideration a genre in which there are many music pieces having fast tempos, a genre in which there are many music pieces having slow tempos, and the like.

In calculating the tempo tendency value, a tendency value, which indicates how frequently a tempo is used for each genre, is set as shown in FIG. 27. As shown in FIG. 27, for a tempo of 65 or less, pop and rock are set at “4” and “1”, respectively. Thus, in the case where a music piece has a tempo of 60, the music piece is evaluated to have a higher degree of correlation with pop than with rock.

Based on setting of such a tendency value and a tempo used for a music piece which is a processed object, a tempo tendency value is calculated for each genre.

Referring back to FIG. 25, next, at step S13, a major/minor key tendency value is calculated. The major/minor key tendency value is used for estimating, from a key of a music piece, which genre the music piece is inclined to. In other words, the major/minor key tendency value is for taking into consideration frequencies of a minor key and a major key in each genre.

In calculating the major/minor key tendency value, a tendency value, which indicates how frequently the minor key and the major key are used for each genre, is set as shown in FIG. 28. As shown in FIG. 28, for the minor key, pop and rock are set at “7” and “3”, respectively. Thus, in the case of a music piece in a minor key, the music piece is evaluated to have a higher degree of correlation with pop than with rock.

Based on setting of such a tendency value and a type of a key used for a music piece which is a processed object, a major/minor key tendency value is calculated for each genre.

Referring back to FIG. 25, when the calculation of each tendency value is finished, at step S14, the above three tendency values are totaled for each genre. The total value of each genre is associated with a music piece number, and outputted to the music piece genre correlation list 250. Then, the music piece genre correlation analysis processing is terminated.

The music piece analysis data 249 and the music piece genre correlation list 250, which are produced through the above processing, are stored together with the game program and the like in the memory card 17. When the player plays the game, the music piece analysis data 249 and the music piece genre correlation list 250 are read in the RAM 24, and used for processing as described below.

Figure 29:
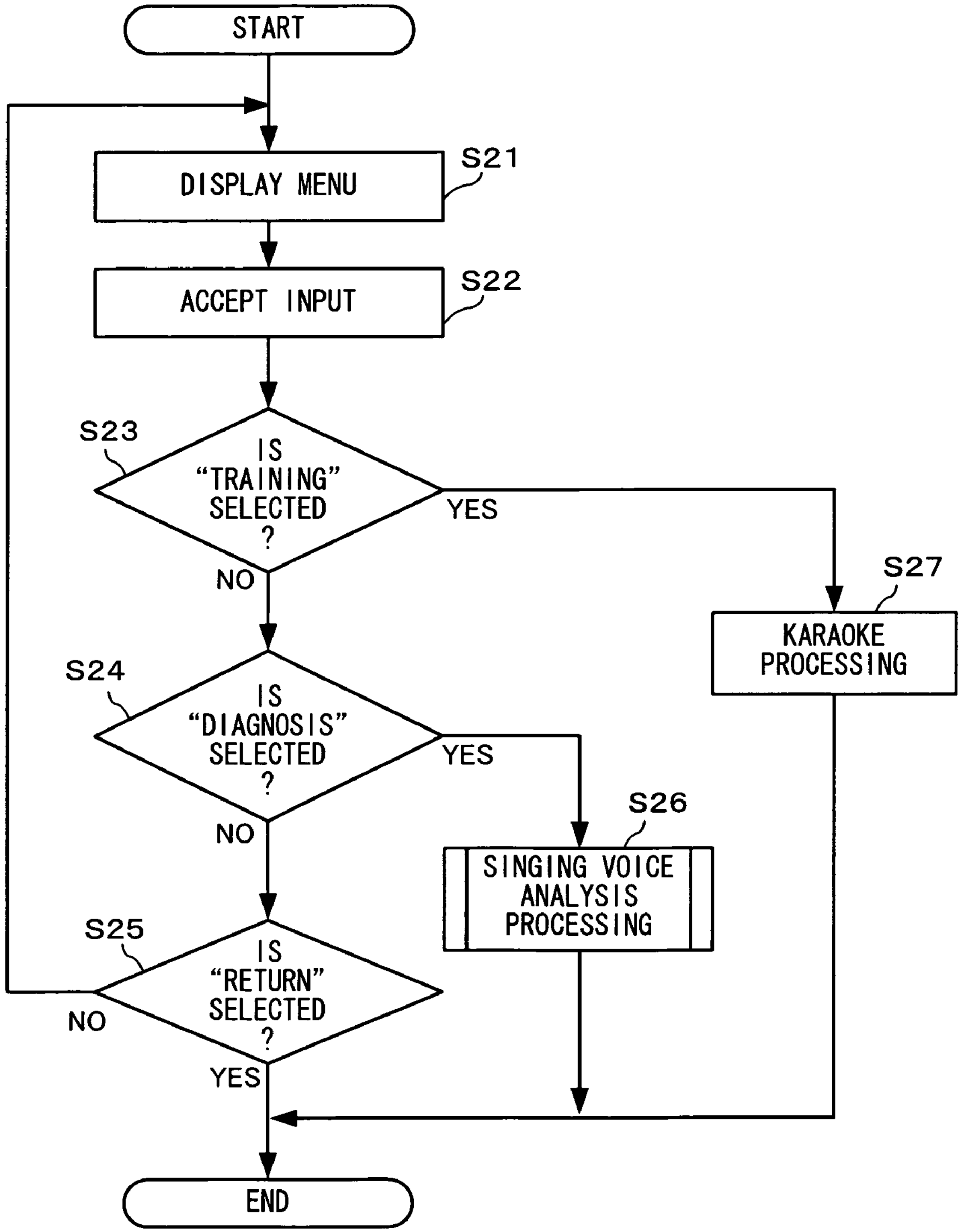
FIG. 29 is an illustrative flow chart showing a procedure of karaoke game processing executed by the game apparatus 10.

With reference to FIGS. 29 to 34, the following will describe the procedure of karaoke game processing which is executed by the game apparatus 10 when a player actually plays the game. FIG. 29 is a flow chart showing the procedure of the karaoke game processing executed by the game apparatus 10. When power is supplied to the game apparatus 10, the CPU core 21 of the game apparatus 10 executes a boot program stored in a boot ROM (not shown) to initialize each unit such as the RAM 24 and the like. Then, the game program stored in the memory card 17 is read into RAM 24, and executed. As a result, a game image is displayed on the first LCD 11 via the first GPU 26, and the game is started. Subsequently, a processing loop of steps S21 to S27 is repeated for every frame (except for the case where step S26 is executed), and the game advances.

At step S21, processing of displaying the menu shown in FIG. 4 on the screen is executed.

Next, at step S22, a selection operation from the player is accepted. When the selection operation from the player is accepted, whether or not “training” is selected is determined at step S23.

As a result of the determination at step S23, when “training” is selected (YES at the step S23), the CPU core 21 executes karaoke processing for reproducing a karaoke music piece at step S27. It is noted that in the illustrative embodiment, since the karaoke processing is not directly relevant to the illustrative embodiments, the description thereof will be omitted.

On the other hand, as the result of the determination at step S23, when “training” is not selected (NO at the step S23), whether or not “diagnosis” is selected is determined at step S24. As a result, when “diagnosis” is selected (YES at step S24), later-described singing voice analysis processing is executed at step S26. On the other hand, when “diagnosis” is not selected (NO at step S24), whether or not “return” is selected is determined at step S25. As a result, when “return” is not selected (NO at step S25), step S21 is returned to, and the processing is repeated. When "return" is selected (YES at the step S25), the karaoke game processing of the illustrative embodiment is terminated.

Figure 30:
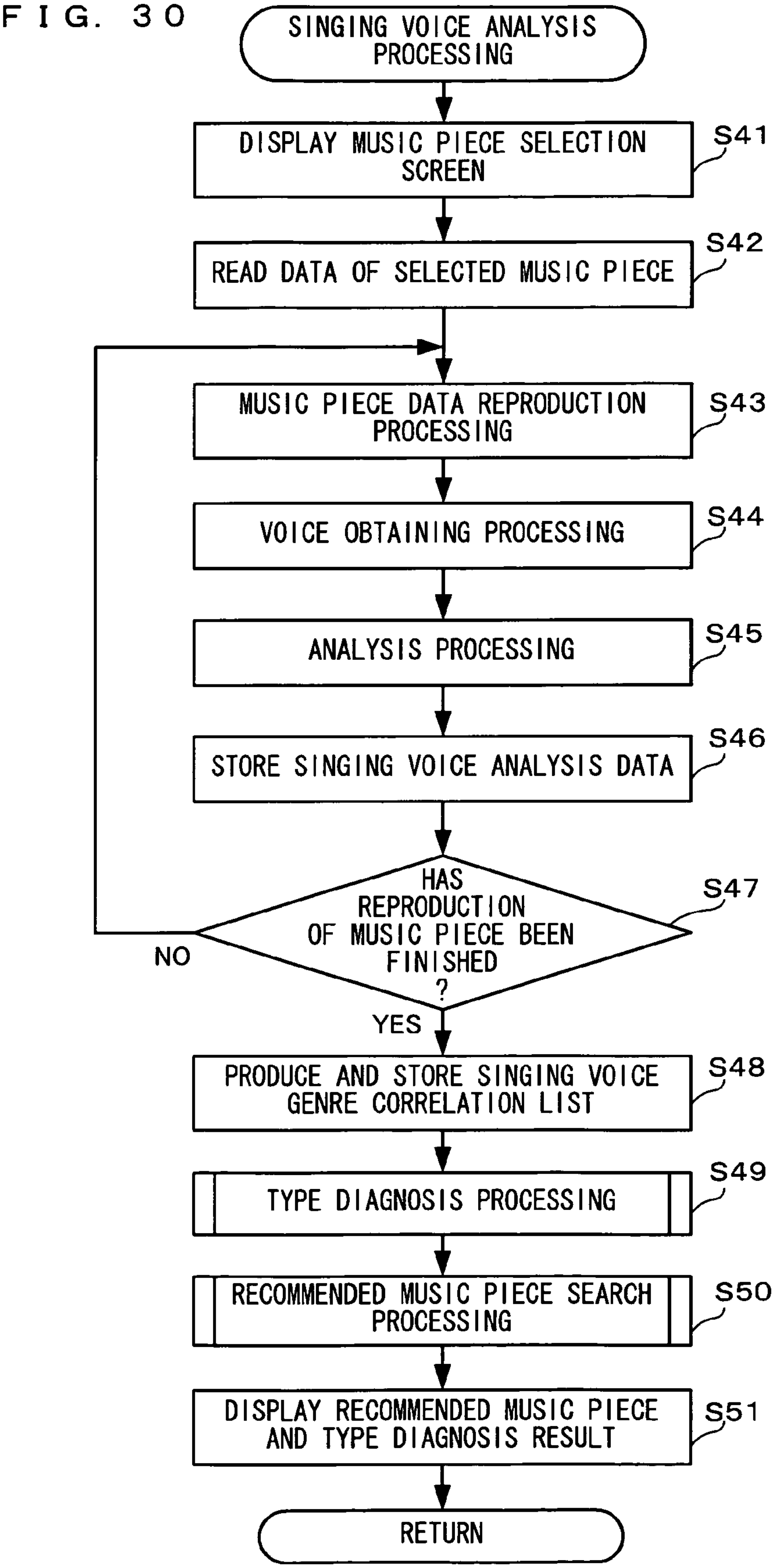
FIG. 30 is an illustrative flow chart showing in detail singing voice analysis processing shown at a step S26 in FIG. 29.

The following will describe the singing voice analysis processing. FIG. 30 is a flow chart showing in detail the singing voice analysis processing shown at step S26. It is noted that in FIG. 30, a processing loop of steps S43 to S46 is repeated for every frame.

As shown in FIG. 30, at step S41, the aforementioned music piece selection screen (see FIG. 5) is displayed. Then, a music piece selection operation by the player is accepted.

When a music piece is selected by the player, musical score data 2483 of the selected music piece is read at the subsequent step S42.

Next, at step S43, processing of reproducing the music piece is executed based on the read musical score data 2483. At the subsequent step S44, processing of obtaining voice data (namely, a singing voice of the player) is executed. Analog-digital conversion is performed on a voice inputted to the microphone 36 thereby to produce input voice data. It is noted that in the illustrative embodiment, a sampling frequency for a voice is 4 kHz (4000 samples per second). In other words, a voice inputted for one second is divided into 4000 pieces, and quantified. Then, fast Fourier transformation is performed on the input voice data thereby to produce frequency-domain data. Based on this data, voice volume value data and pitch data of the singing voice of the player are produced. The voice volume value data is obtained by calculating an average of values obtained by squaring each value of closest 256 samples for each frame. The pitch data is obtained by detecting a pitch based on a frequency, and indicated by a numerical value (e.g. a value of 0 to 127) for each pitch.

Next, at step S45, analysis processing is executed. In this processing, the voice volume value data and the pitch data are analyzed to produce the singing voice analysis data 253. Each singing voice parameter 2532 of the singing voice analysis data 253 is calculated by executing the following processing.

With respect to "voice volume", the following processing is executed. A constant voice volume value is set at 100 points (namely, a reference value), and a score is calculated for each frame. An average of scores from the start of a music piece to the end thereof is calculated, and stored as the "voice volume".

Next, concerning "groove", processing for analyzing whether or not an accent (a voice volume equal to or larger than a constant volume) occurs for each period of a half note is executed. More specifically, using the Goertzel algorithm, a frequency component for a period of a half note is observed with respect to the voice volume data of each frame. Then, a result value of the observation is multiplied by a predetermined constant number to calculate the "groove" in the range between 0 and 100 points.

Next, concerning "accent", processing similar to the "groove" processing is executed to calculate the "accent". However, different from the "groove", a frequency component is observed for each period of two bars.

Next, concerning "strength", processing similar to the "groove" is executed to calculate the "strength". However, different from the "groove", a frequency component is observed for each period of an eighth note.

Next, concerning "musical interval sense", the following ratio is calculated and stored. In other words, among frames in which portions including lyrics are played, a ratio of frames, in each of which a pitch of the singing voice of the player (calculated from the above pitch data) is within a semitone higher or lower from a pitch indicated by a musical note, is calculated to obtain the "musical interval sense".

Next, concerning "rhythm", the following ratio is calculated and stored. Specifically, a ratio of a number of musical notes with lyrics, with respect to each of which a start timing of singing is within a constant time from a timing indicated by the musical note, and with respect to each of which a pitch of the singing voice of the player at a frame at the start timing of singing is within a semitone higher or lower from a pitch indicated by the musical note, to a number of all musical notes is calculated.

Next, "vibrato" is obtained by checking a number of times (a time) which a vibrato is put. The number of times a variation in a sound occurs for one second is checked, and a processing burden is increased if checking is performed for the whole frequencies. Thus, in the illustrative embodiment, components in three frequencies, 3 Hz, 4.5 Hz, and 6.5 Hz are checked. This is because it is generally considered to recognize (hear) that a vibrato is put if variation in a sound in the range between 3 Hz and 6.5 Hz is maintained for a certain time. Thus, the checking is performed for an upper limit (6.5 Hz), a lower limit (3 Hz), and an, intermediate value (4.5 Hz) in the above range, and hence becomes efficient. More specifically, the following processing is executed. Using the Goertzel algorithm, components of the inputted voice of the player in 3 Hz, 4.5 Hz, and 6.5 Hz are checked. The number of frames in which maximum values of the three frequency components exceed a constant threshold value is multiplied by the predetermined coefficient $\alpha$, and the calculated value is stored as the "vibrato".

Next, concerning "roll", the following processing is executed. A frame, in which a pitch of the singing voice of the player is raised from a pitch in the last frame, is detected during a period from a position of each musical note to a time when the pitch of the singing voice of the player reaches a correct pitch (a pitch indicated by the musical note). As an evaluation score concerning the frame, points are added in accordance with a raised amount of the pitch. Then, the evaluation scores for the entire music piece are totalized to calculate a total score. Further, a value obtained by multiplying the total score by the predetermined coefficient $\alpha$ is stored as the "roll".

Next, concerning "singing range", for a diatonic scale, an average of voice volume values, with which a pitch of a singing voice is maintained for a certain time period or more, a time is calculated from the start of playing a music piece. Then, a value, which is obtained by multiplying by 4 a pitch (0 to 25) having the maximum value among values obtained by adding to the average values for one octave higher and lower from a central pitch in accordance with Gaussian distribution, is regarded as the "singing range".

Figure 31:
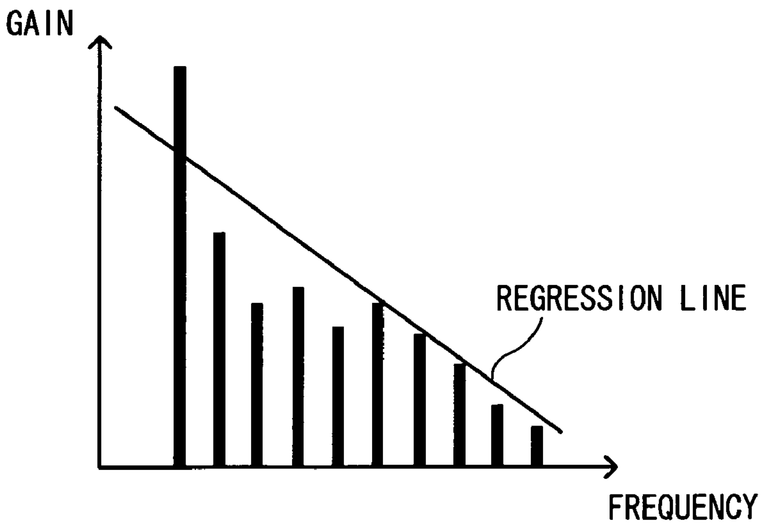
FIG. 31 illustrates an example of spectrum data when a voice quality is analyzed.

Next, concerning "voice quality", the following processing is executed. Spectrum data as shown in FIG. 31 is obtained from the inputted voice of the player. Then, a straight line (a regression line), which indicates a characteristic of the spectrum, is calculated. The straight line naturally extends diagonally downward to right. When the inclination of the straight line is small, the voice is determined to have many high-frequency components (a bright voice). When the inclination of the straight line is large, the voice is determined to be an inward voice. More specifically, an average of FFT spectrum of the inputted voice of the player is calculated from the start of reproduction to the end thereof. The inclination of the regression line in the graph having sample values with a frequency direction as x and with a gain direction as y is calculated. Then, a value obtained by multiplying the inclination by the predetermined coefficient $\alpha$ is stored as the "voice quality".

Referring back to FIG. 30, when the analysis processing at step S45 is finished, each singing voice parameter calculated as a result of the above analysis processing is stored as the singing voice analysis data 253 at step S46. The singing voice analysis data is stored for each frame. In other words, the result of the singing voice analysis is stored in real time. Thus, for example, even if the singing voice analysis processing is interrupted, the following processing can be executed by using the singing voice analysis data 253 based on the singing voice until the interrupting point.

Next, at step S47, whether or not reproduction of the music piece has been finished is determined. When the reproduction of the music piece has not been terminated (NO at step S47), step S43 is returned to, and the processing is repeated.

On the other hand, when the reproduction of the music piece has been finished (YES at step S47), the singing voice genre correlation list 254 is produced based on the singing voice analysis data 253 and the genre master 247 at step S48. In other words, a correlation value between each singing voice parameter of the singing voice analysis data 253 and each singing voice parameter definition 2472 of the genre master 247 is calculated. In the illustrative embodiment, the correlation value is calculated by using a Pearson's product-moment correlation coefficient. The correlation coefficient is an index which indicates correlation (a degree of similarity) between two random variables, and ranges from −1 to 1. When a correlation coefficient is close to 1, two random variables have positive correlation, and a similarity therebetween is high. When a correlation coefficient is close to −1, two random variables have negative correlation, and a similarity therebetween is low. More specifically, where a data row, $(x,y)=\{(x_i,y_i)\}$, including two pairs of numerical values is given, a correlation coefficient is obtained as follows.

equation 1

$$\frac{\sum_{i=1}^{n}(x_i-\overline{x})(y_i-\overline{y})}{\sqrt{\sum_{i=1}^{n}(x_i-\overline{x})^2}\sqrt{\sum_{i=1}^{n}(y_i-\overline{y})^2}}$$

It is noted that in the above equation 1, $\overline{x},\overline{y}$ are arithmetic averages of $x=\{x_i\}$, $y=\{y_i\}$. In the illustrative embodiment, the correlation value between each singing voice parameter of the singing voice analysis data 253 and each singing voice parameter definition 2472 of the genre master 247 is calculated by assigning the singing voice parameter of the singing voice analysis data 253 to x of the above data row, and the singing voice parameter definition 2472 to y of the above data row.

By using the above equation 1, a correlation value with a singing voice is calculated for each genre. Based on the calculated result, the singing voice genre correlation list 254 is produced as shown in FIG. 17, and stored in the work area 252.

Figure 32:
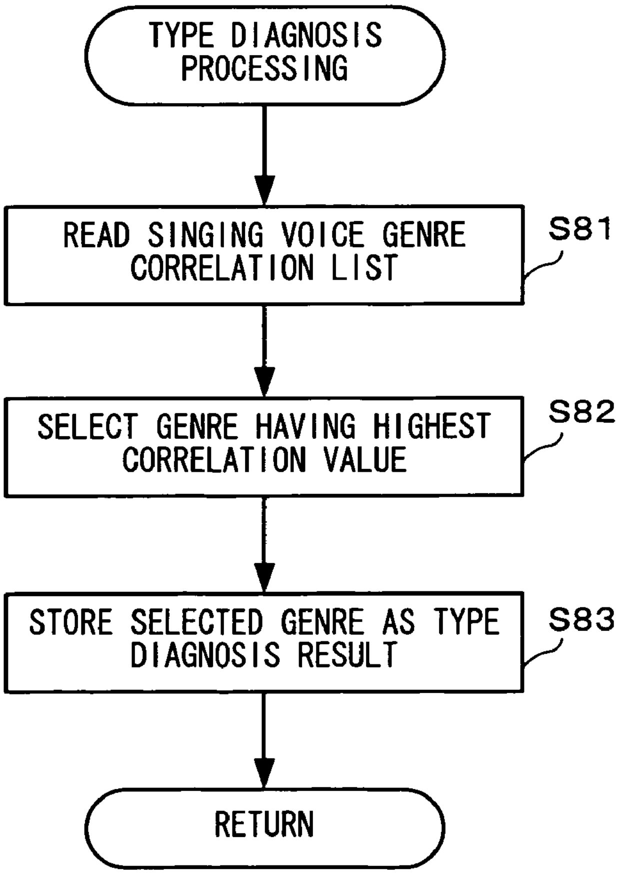
FIG. 32 is an illustrative flow chart showing in detail type diagnosis processing shown at a step S49 in FIG. 30.

Next, at step S49, type diagnosis processing is executed. FIG. 32 is a flow chart showing in detail the type diagnosis processing. As shown in FIG. 32, at step S81, the singing voice genre correlation list 254 produced at step S48 is read. Next, at step S82, a genre name 2541 having the highest correlation value 2542 is selected. At step S83, the selected genre name 2541 is stored as the type diagnosis result 258. Then, the type diagnosis processing is terminated.

Referring back to FIG. 30, when the type diagnosis processing is terminated, recommended music piece search processing is executed at step S50. This processing corresponds to the singing voice music piece correlation analysis P4 in FIG. 7. Specifically, a correlation value between a singing voice of the player and each music piece in the music piece data 248 is calculated based on the music piece analysis data 249, the music piece genre correlation list 250, the singing voice analysis data 253, and the singing voice genre correlation list 254, and processing of searching for a music piece suitable for the singing voice of the player is executed.

Figure 33:
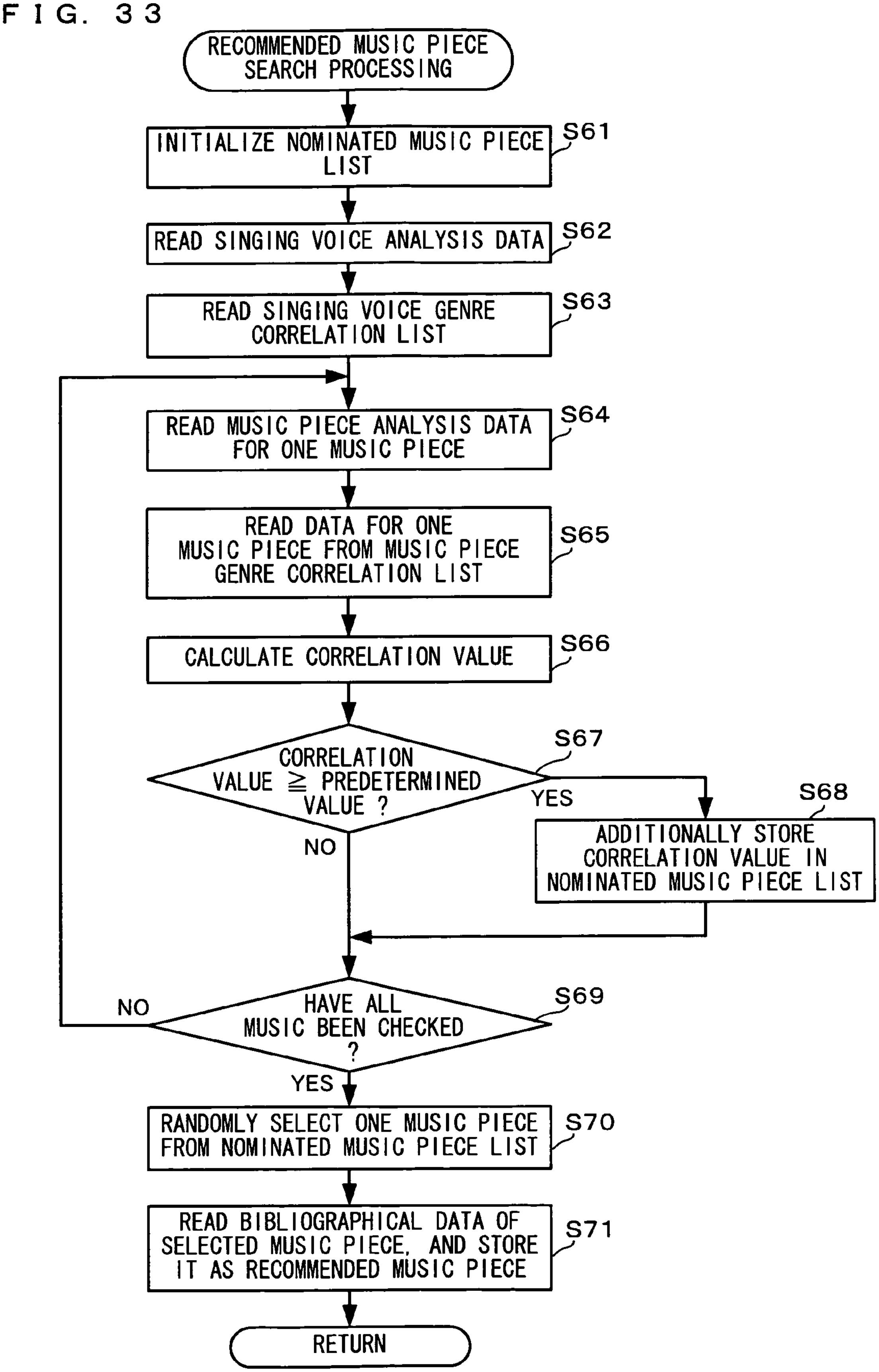
FIG. 33 is an illustrative flow chart showing in detail recommended music piece search processing shown at a step S50 in FIG. 30.

FIG. 33 is a flow chart showing in detail the recommended music piece search processing shown at step S50. As shown in FIG. 33, at step S61, the nominated music piece list 256 is initialized.

Next, at step S62, the singing voice analysis data 253 is read. In addition, at step S63, the singing voice genre correlation list 254 is read. In other words, all of the parameters concerning the singing voice (namely, an analysis result of the singing voice) are read.

Next, at step S64, the music piece parameter for one music piece is read from the music piece analysis data 249. In addition, at step S65, data corresponding to the music piece read at step S64 is read from the music piece genre correlation list 250. In other words, all of the parameters concerning the music piece (namely, an analysis result of the music piece) are read.

Next, at step S66, a correlation value between the singing voice of the player and the read music piece by using the above Pearson's product-moment correlation coefficient. More specifically, the values of the singing voice parameter (see FIG. 17) and the correlation value in the singing voice genre correlation list 254 (see FIG. 18) for each genre are assigned to x of the data row in the above equation 1. Concerning the singing voice parameter, more properly, the same items as those of the music piece parameter are used. More specifically, five items, namely, the musical interval sense, the rhythm, the vibrato, the roll, and the voice quality are used. Then, each value of the music piece parameter (see FIG. 15), and the correlation value for each genre concerning the music piece which is currently a processed object, which correlation value is read from the music piece genre correlation list 250 (see FIG. 16), are assigned to y of the data row, thereby calculating a correlation value. In other words, processing of calculating a comprehensive similarity between the singing voice of the player and the read music piece, which comprehensive similarity takes into consideration a similarity between the patterns of the two radar charts shown in FIGS. 8A and 8B (a similarity between a singing voice and a music piece) and a similarity between patterns of radar charts showing the contents in FIG. 16 (only a music piece which is a processed object) and FIG. 18, is executed.

Next, at step S67, whether or not the correlation value calculated at step S66 is equal to or larger than a predetermined value is determined. As a result, concerning a music piece having a correlation value equal to or larger than the predetermined value (YES at the step S67), a music piece number of the music piece and the calculated correlation value are additionally stored in the nominated music piece list 256 at step S68.

Next, at step S69, whether or not the correlation values of all of the music pieces have been calculated is determined. As a result, when the calculation of the correlation values of all of the music pieces has not been finished yet (NO at the step 69), step S64 is returned to, and the processing is repeated for music pieces, the correlation values of which have not been calculated yet.

On the other hand, as the result of the determination at step S69, when the correlation values of all of the music pieces have been calculated (YES at step S69), a music piece is randomly selected from the nominated music piece list 256 at step S70. At step S71, a music piece number of the selected music piece is stored as the recommended music piece 257. It is noted that a music piece may not be randomly selected from the nominees, but a music piece having the highest correlation value may be selected therefrom. Then, the recommended music piece search processing is terminated.

Referring back to FIG. 30, when the type diagnosis processing is terminated, processing of displaying a recommended music piece and a result of the type diagnosis is executed at step S51. More specifically, based on the music piece number stored in the recommended music piece 257, the bibliographical data 2482 is obtained from the music piece data 248. Then, based on the bibliographical data 2482, a music piece name and the like are displayed on the screen (the recommended music piece may be reproduced). Further, the genre name stored in the type diagnosis result 258 is read, and displayed on the screen. Then, the singing voice analysis is terminated.

As described above, in the illustrative embodiment, the singing voice of the player is analyzed to calculate and produce data which indicates a characteristic of the singing voice. Then, processing of calculating a similarity between data obtained by analyzing a characteristic of a music piece from the musical score data and data obtained by analyzing the characteristic of the singing voice is executed, thereby searching for and displaying a music piece suitable for the player (a singing person). This enhances the enjoyment of the karaoke game. Also, a music piece, which is easy to sing, is shown to a player who is bad at karaoke, and it is possible to provide a chance for enjoying karaoke. Further, it is possible to make a player, who has been avoiding karaoke, enjoy the karaoke game pleasantly. Therefore, it is possible to provide a karaoke game which a wide range of players can enjoy. In addition, a music genre suitable for the singing voice of the player can be shown. Thus, it is easy for the player to select a music piece suitable for his or her singing voice, and the like by making selection of a karaoke music piece focusing on the shown genre, and the enjoyment of the karaoke game is enhanced.

It has been described that the music piece analysis processing is executed prior to game play by the player (prior to shipment of the memory card 17 which is a game product). However, the illustrative embodiments are not limited thereto, and the music piece analysis processing may be executed during the game processing. For example, the game program is programmed so as to add the music piece data 248 by downloading it from a predetermined server. When a music piece is additionally stored in the game apparatus 10 by downloading it, the music piece analysis processing may be executed. Thus, the added music piece can be analyzed to produce analysis data, and a range of selection of a music piece suitable for the player can be widened. Alternatively, the game program may be programmed so that the player can compose a music piece. The music piece analysis processing may be executed with respect to the music piece composed by the player to update the music piece analysis data and the music piece genre correlation list. This enhances the enjoyment of the karaoke game.

The method of the recommended music piece search processing executed at step S50 is merely an example, and the illustrative embodiments are not limited thereto. Any method of the recommended music piece search processing may be used as long as a similarity is calculated from the music piece parameter and the singing voice parameter. For example, the following method of the recommended music piece search processing may be used.

Figure 34:
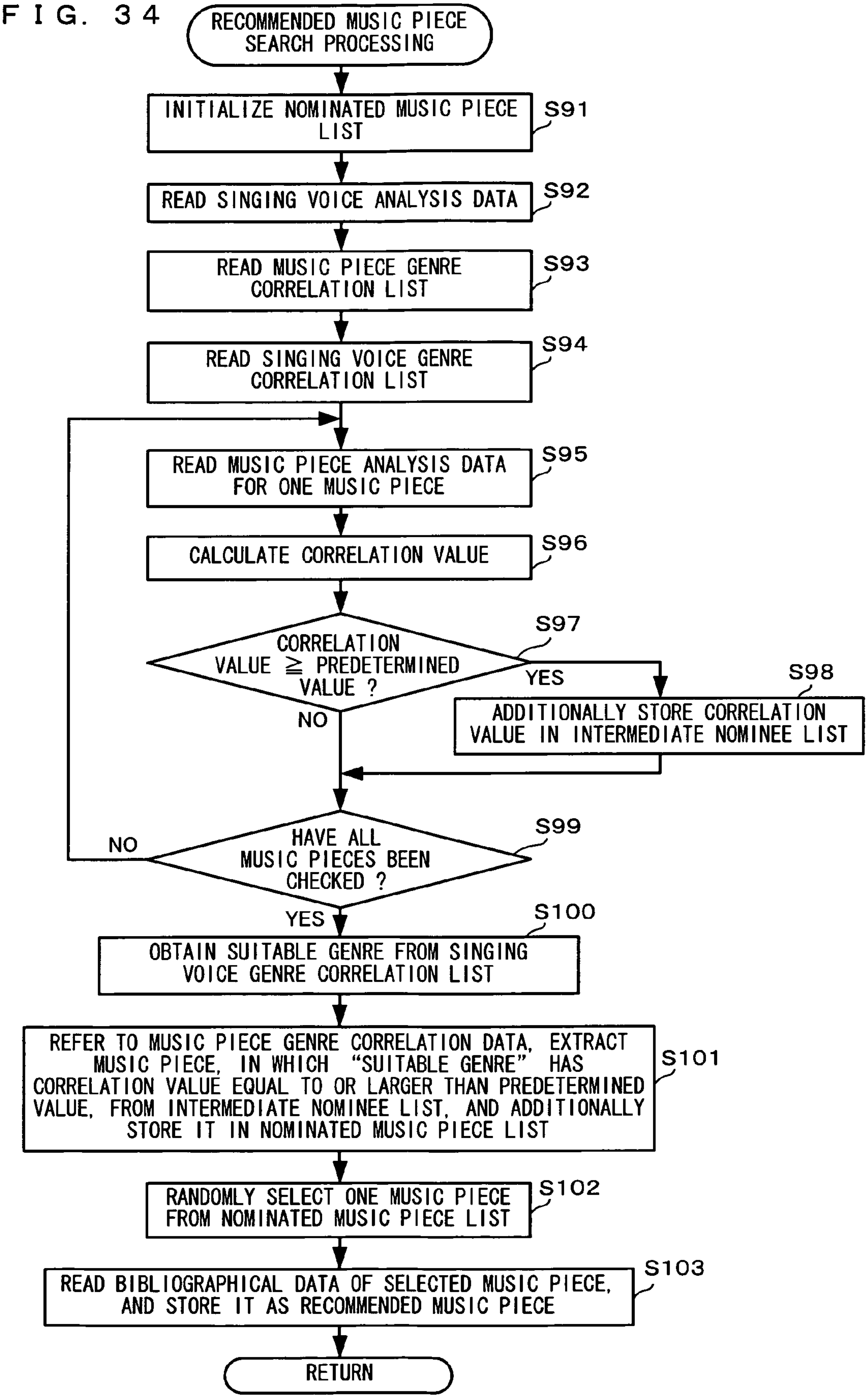
FIG. 34 is an illustrative flow chart showing in detail another example of the recommended music piece search processing shown at the step S50 in FIG. 30.

FIG. 34 is a flow chart showing another method of the recommended music piece search processing shown at the step S50. As shown in FIG. 34, at step S91, the intermediate nominee list 255 and the nominated music piece list 256 are initialized.

Next, at step S92, the singing voice analysis data 253 is read. At the subsequent step S93, the music piece genre correlation list 250 is read. Further, at step S94, the singing voice genre correlation list 254 is read.

Next, at step S95, the music piece parameter for one music piece is read from the music piece analysis data 249.

Next, at step S96, a correlation value between the singing voice of the player (namely, the singing voice analysis data 253) and the music piece of the read music piece parameter is calculated by using the Pearson's product-moment correlation coefficient.

Next, at step S97, whether or not the correlation value calculated at step S96 is equal to or larger than a predetermined value is determined. As a result, concerning a music piece having a correlation value equal to or larger than the predetermined value (YES at step S97), a music piece number of the music piece and the calculated correlation value are additionally stored in the intermediate nominee list 255 at step S98.

Next, at step S99, whether or not the correlation values of all of the music pieces have been calculated is determined. As a result, when the calculation of the correlation values of all of the music pieces has not been finished yet (NO at step S99), step S95 is returned to, and the processing is repeated for music pieces, the correlation values of which have not been calculated yet.

On the other hand, as the result of the determination at step S99, when the correlation values of all of the music pieces have been calculated (YES at step S99), it means that the intermediate nominee list 255 including, for example, contents as shown in FIG. 35A are produced. In the intermediate nominee list 255 in FIG. 35A, music pieces having correlation values equal to or larger than 0 have been extracted. At the subsequent step S100, a genre name 2541 of a genre (hereinafter, referred to as a suitable genre) having a correlation value with the singing voice, which is equal to or larger than a predetermined value, is obtained from the singing voice genre correlation list 254. For example, when the contents of the singing voice genre correlation list 254 are sorted in ascending order of the correlation values, contents are obtained as shown in FIG. 35B. Here, a genre having a correlation value equal to or larger than the predetermined value is assumed to be only "pop". Thus, the genre name 2541 of the suitable genre is "pop". It is noted that although a number of the suitable genre is narrowed down to only one here for convenience of explanation, a plurality of genre names 2541 may be obtained.

Next, at step S101, the music piece genre correlation list 250 is referred to, and a music piece number of a music piece, in which the "suitable genre" has a correlation value equal to or larger than the predetermined value, is extracted from the intermediate nominee list 255. The music piece number is additionally stored in the nominated music piece list 256. For example, it is assumed that contents are obtained as shown in FIG. 35C when the contents in the music piece genre correlation list 250 are sorted in ascending order of the correlation values. Then, the "suitable genre having a correlation value equal to or larger than a predetermined value" is assumed as "the genre having the highest correlation value" (a genre at "first place" in FIG. 35C). In this case, since the suitable genre is "pop", a music piece, in which a genre having the highest correlation value is "pop", (in FIG. 35C, music piece 1, music piece 3, and music piece 5) is extracted from the contents in FIG. 35C. As a result, a nominated music piece list 256 including contents as shown in FIG. 35D is produced. Then, the processing at step S51 may be executed by using this nominated music piece list 256.

Instead of the above methods of the recommended music piece search processing, the following method may be used. For example, a correlation value between the singing voice analysis data 253 and the music piece analysis data 249 is calculated. Next, for the contents in the singing voice genre correlation list 254, weight values are set in ascending order of the correlation values. Also, for the contents in the music piece genre correlation list 250, weight values are set in ascending order of the correlation values. Then, the correlation value between the singing voice analysis data 253 and the music piece analysis data 249 is adjusted by multiplying it by the weight value. Based on the adjusted correlation value, a recommended music piece may be selected. As described above, any method of the recommended music piece search processing may be used as long as a similarity is calculated from the music piece parameter and the singing voice parameter.

Items which are objects to be analyzed for a music piece and a singing voice, namely, the music piece parameter and the singing voice parameter are not limited to the aforementioned contents. As long as the parameter indicates each of characteristics of a music piece and a singing voice and a correlation value is calculated therefrom, any parameter may be used.

While the illustrative embodiments have been described in detail, the foregoing description and all exemplary features are not to be limited by the disclosure. It is understood that numerous other modifications and variations can be devised and that the invention is intended to be defined by the following claims.

What is claimed is:

1. A music displaying apparatus comprising:

a voice input device to obtain voice data concerning singing of a user;

singing characteristic analysis programmed logic circuitry for analyzing the voice data to calculate a plurality of singing characteristic parameters which indicate a characteristic of the singing of the user;

music piece related information storage medium for storing music piece related information concerning a music piece;

comparison parameter storage medium for storing a plurality of comparison parameters, which are to be compared with the plurality of singing characteristic parameters, so as to be associated with the music piece related information;

comparison programmed logic circuitry for comparing the plurality of singing characteristic parameters with the plurality of comparison parameters to calculate a similarity between the plurality of singing characteristic parameters and the plurality of comparison parameters;

selection programmed logic circuitry for selecting at least one piece of the music piece related information which is associated with a comparison parameter which has a high similarity with the singing characteristic parameter;

a display to display information based on the music piece related information selected by the selection programmed logic circuitry, wherein the music piece related information includes music piece data for reproducing at least the music piece, the comparison parameter includes a parameter which indicates a musical characteristic of the music piece so as to be associated with the music piece data, the selection programmed logic circuitry selects at least one piece of the music piece data which is associated with the comparison parameter which has the high similarity with the singing characteristic parameter, the display to display information of the music piece based on the music piece data selected by the selection programmed logic circuitry, the music piece related information includes genre data which indicates a music genre, and the comparison parameter includes a parameter which indicates a musical characteristic of the music genre, music piece genre similarity data storage medium for storing music piece genre similarity data which indicates a similarity between the music piece and the music genre; and voice genre similarity calculation programmed logic circuitry for calculating a similarity between the singing characteristic parameter and the music genre, wherein the selection programmed logic circuitry selects the music piece data based on the similarity calculated by the voice genre similarity calculation programmed logic circuitry and the music piece genre similarity data stored by the music piece genre similarity data storage medium.

2. The music displaying apparatus according to claim 1, wherein the music piece data includes musical score data for indicating musical instruments used for playing the music piece, a tempo of the music piece, and a key of the music piece, and the music displaying apparatus further comprises music piece genre similarity calculation programmed logic circuitry for calculating a similarity between the music piece and the music genre based on the musical instruments, the tempo and the key which are included in the musical score data.

3. The music displaying apparatus according to claim 1, wherein each of the plurality of singing characteristic parameters and the plurality of comparison parameters includes a value obtained by evaluating one of accuracy of pitch concerning the singing of the user, variation in pitch, a periodical input of voice, and a singing range.

4. The music displaying apparatus according to claim 1, wherein the music piece data includes musical score data which indicates musical instruments used for the music piece, a tempo of the music piece, a key of the music piece, a plurality of musical notes which constitute the music piece, the singing characteristic analysis programmed logic circuitry includes voice volume/pitch data calculation programmed logic circuitry for calculating, from the voice data, voice volume value data which indicates a voice volume value, and pitch data which indicates a pitch, and the singing characteristic analysis programmed logic circuitry compares at least one of the voice volume value data and the pitch data with the musical score data to calculate the singing characteristic parameter.

5. The music displaying apparatus according to claim 4, wherein the singing characteristic analysis programmed logic circuitry calculates the singing characteristic parameter based on an output value of a frequency component for a predetermined period from the voice volume value data.

6. The music displaying apparatus according to claim 4, wherein the singing characteristic analysis programmed logic circuitry calculates the singing characteristic parameter based on a difference between a start timing of each musical note of a melody part of a musical score indicated by the musical score data and an input timing of voice based on the voice volume value data.

7. The music displaying apparatus according to claim 4, wherein the singing characteristic analysis programmed logic circuitry calculates the singing characteristic parameter based on a difference between a pitch of a musical note of a musical score indicated by the musical score data and a pitch based on the pitch data.

8. The music displaying apparatus according to claim 4, wherein the singing characteristic analysis programmed logic circuitry calculates the singing characteristic parameter based on an amount of change in pitch for each time unit in the pitch data.

9. The music displaying apparatus according to claim 4, wherein the singing characteristic analysis programmed logic circuitry calculates, from the voice volume value data and the pitch data, the singing characteristic parameter based on a pitch having a maximum voice volume value among voices, a pitch of each of which is maintained for a predetermined time period or more.

10. The music displaying apparatus according to claim 4, wherein the singing characteristic analysis programmed logic circuitry calculates a quantity of high-frequency components included in the voice of the user from the voice data, and calculates the singing characteristic parameter based on a calculated result.

11. A music displaying apparatus comprising:

a voice input device to obtain voice data concerning singing of a user;

singing characteristic analysis programmed logic circuitry for analyzing the voice data to calculate a plurality of singing characteristic parameters which indicate a characteristic of the singing of the user;

music piece related information storage medium for storing music piece related information concerning a music piece;

comparison parameter storage medium for storing a plurality of comparison parameters, which are to be compared with the plurality of singing characteristic parameters, so as to be associated with the music piece related information;

comparison programmed logic circuitry for comparing the plurality of singing characteristic parameters with the plurality of comparison parameters to calculate a similarity between the plurality of singing characteristic parameters and the plurality of comparison parameters;

selection programmed logic circuitry for selecting at least one piece of the music piece related information which is associated with a comparison parameter which has a high similarity with the singing characteristic parameter; and a display to display information based on the music piece related information selected by the selection programmed logic circuitry, wherein the music piece related information includes genre data which indicates at least a music genre, the comparison parameter includes a parameter which indicates a musical characteristic of the music genre so as to be associated with the music genre, the selection programmed logic circuitry selects the music genre which is associated with the comparison parameter which has the high similarity with the singing characteristic parameter, and the display to display a name of the music genre as information based on the music piece related information.

12. The music displaying apparatus according to claim 1, wherein the music piece data includes musical score data for indicating musical instruments used for playing the music piece, a tempo of the music piece, and a key of the music piece, the music displaying apparatus further comprises music piece parameter calculation programmed logic circuitry for calculating, from the musical score data, the comparison parameter for each music piece, and the comparison parameter storage medium stores the comparison parameter calculated by the music piece parameter calculation programmed logic circuitry.

13. The music displaying apparatus according to claim 12, wherein the music piece parameter calculation programmed logic circuitry calculates, from the musical score data, the comparison parameter based on a difference in pitch between two adjacent musical notes, a position of a musical note within a beat, and a total time of musical notes having lengths equal to or larger than a predetermined threshold value.

14. A non-transitory computer-readable storage medium storing a music displaying program which causes a computer of a music displaying apparatus, which shows a music piece to a user, to perform a method comprising:

obtaining voice data concerning singing of the user;

analyzing the voice data to calculate a plurality of singing characteristic parameters which indicate a characteristic of the singing of the user;

storing music piece related information concerning a music piece;

storing a plurality of comparison parameters, which are operable to be compared with the plurality of singing characteristic parameters, so as to be associated with the music piece related information;

comparing the plurality of singing characteristic parameters with the plurality of comparison parameters to calculate a similarity between the plurality of singing characteristic parameters and the plurality of comparison parameters;

selecting selection results, the selection results including at least one piece of the music piece related information which is associated with a comparison parameter of the plurality of comparison parameters which has a high similarity with a singing characteristic parameter of the plurality of singing characteristic parameters; and displaying resultant information based on the selection results, wherein the music piece related information includes music piece data for reproducing at least the music piece, the comparison parameter includes a parameter which indicates a musical characteristic of the music piece so as to be associated with the music piece data, and the selection results including at least one piece of the music piece data which is associated with the comparison parameter which has a high similarity with the singing characteristic parameter, the music piece related information includes genre data which indicates a music genre, and the comparison parameter includes a musical characteristic parameter of the music genre, storing music piece genre similarity data which indicates a similarity between the music piece and the music genre; and calculating a similarity between the singing characteristic parameter and the music genre, wherein the at least one piece of music piece data selection based on the similarity calculated between the signing characteristic parameter and the music genre and the music piece genre similarity data.

15. The computer-readable storage medium according to claim 14, wherein the music piece data includes musical score data for indicating musical instruments used for playing the music piece, a tempo of the music piece, and a key of the music piece, and the computer-readable storage medium stores the music displaying program which causes the computer of the music displaying apparatus to perform the method further comprising:

calculating a similarity between the music piece and the music genre based on the musical instruments, the tempo, and the key which are included in the musical score data.

16. The computer-readable storage medium according to claim 14, wherein each of the plurality of singing characteristic parameters and the plurality of comparison parameters includes a value of accuracy of pitch concerning the singing of the user, a variation in pitch, a periodical input of voice, and a singing range.

17. The computer-readable storage medium according to claim 14, wherein the music piece data includes musical score data which indicates musical instruments used for the music piece, a tempo of the music piece, a key of the music piece, a plurality of musical notes which constitute the music piece, the analyzing the voice data to calculate a plurality of singing characteristic parameters which indicate a characteristic of the singing of the user further comprises:

calculating, from the voice data, voice volume value data which indicates a voice volume value, and pitch data which indicates a pitch, and comparing at least one of the voice volume value data and the pitch data with the musical score data to calculate the singing characteristic parameter.

18. The computer-readable storage medium according to claim 17, wherein the analyzing the voice data to calculate a plurality of singing characteristic parameters which indicate a characteristic of the singing of the user further comprises: calculating the singing characteristic parameter based on an output value of a frequency component for a predetermined period from the voice volume value data.

19. The computer-readable storage medium according to claim 17, wherein the analyzing the voice data to calculate a plurality of singing characteristic parameters which indicate a characteristic of the singing of the user further comprises: calculating the singing characteristic parameter based on a difference between a start timing of each musical note of a melody part of a musical score indicated by the musical score data and an input timing of voice based on the voice volume value data.

20. The computer-readable storage medium according to claim 17, wherein the analyzing the voice data to calculate a plurality of singing characteristic parameters which indicate a characteristic of the singing of the user further comprises: calculating the singing characteristic parameter based on a difference between a pitch of a musical note of a musical score indicated by the musical score data and a pitch based on the pitch data.

21. The computer-readable storage medium according to claim 17, wherein the analyzing the voice data to calculate a plurality of singing characteristic parameters which indicate a characteristic of the singing of the user further comprises: calculating the singing characteristic parameter based on an amount of change in pitch for each time unit in the pitch data.

22. The computer-readable storage medium according to claim 17, wherein the analyzing the voice data to calculate a plurality of singing characteristic parameters which indicate a characteristic of the singing of the user further comprises: calculating from the voice volume value data and the pitch data, the singing characteristic parameter based on a pitch having a maximum voice volume value among voices, a pitch of each of which is maintained for a predetermined time period or more.

23. The computer-readable storage medium according to claim 17, wherein the analyzing the voice data to calculate a plurality of singing characteristic parameters which indicate a characteristic of the singing of the user further comprises: calculating a quantity of high-frequency components included in the voice of the user from the voice data, and calculates the singing characteristic parameter based on a calculated result.

24. The computer-readable storage medium according to claim 14, wherein the music piece data includes musical score data for indicating musical instruments used for playing the music piece, a tempo of the music piece, and a key of the music piece, and the music displaying program further causes the computer of the music displaying apparatus to perform a method further comprising calculating, from the musical score data, the comparison parameter for each music piece.

25. The computer-readable storage medium according to claim 24, wherein calculating, from the musical score data, the comparison parameter for each music piece further comprises calculating, from the musical score data, the comparison parameter based on a difference in pitch between two adjacent musical notes, a position of a musical note within a beat, and a total time of musical notes having lengths equal to or larger than a predetermined threshold value.

26. A non-transitory computer-readable storage medium storing a music displaying program which causes a computer of a music displaying apparatus, which shows a music piece to a user, to perform a method comprising:

obtaining voice data concerning singing of the user;

analyzing the voice data to calculate a plurality of singing characteristic parameters which indicate a characteristic of the singing of the user;

storing music piece related information concerning a music piece;

storing a plurality of comparison parameters, which are operable to be compared with the plurality of singing characteristic parameters, so as to be associated with the music piece related information;

comparing the plurality of singing characteristic parameters with the plurality of comparison parameters to calculate a similarity between the plurality of singing characteristic parameters and the plurality of comparison parameters;

selecting selection results, the selection results including at least one piece of the music piece related information which is associated with a comparison parameter of the plurality of comparison parameters which has a high similarity with a singing characteristic parameter of the plurality of singing characteristic parameters; and displaying resultant information based on the selection results, wherein the music piece related information includes genre data which indicates at least a music genre, the comparison parameter includes a parameter which indicates a musical characteristic of the music genre so as to be associated with the music genre, and the selection results includes the music genre which is associated with the comparison parameter which has a high similarity with the singing characteristic parameter.

27. A method for correlating a music piece to a singing user of a computer music system, the method comprising:

obtaining voice data from the singing user;

analyzing the voice data to calculate a plurality of singing characteristic parameters which correspond to singing characteristics of the singing user;

storing music piece related information concerning a plurality of music pieces and a plurality of comparison parameters associated with each one of the plurality of music pieces;

comparing the plurality of singing characteristic parameters with the plurality of comparison parameters to calculate a similarity between the plurality of singing characteristic parameters and the plurality of comparison parameters;

selecting at least one music piece from the plurality of music pieces when the similarity between the plurality of comparison parameters to the plurality of singing characteristic parameters is high;

displaying results based on the at least one music piece selected, wherein the music piece related information includes music piece data for reproducing at least the music piece, the comparison parameter includes a parameter which indicates a musical characteristic of the music piece so as to be associated with the music piece data, at least one piece of the music piece data which is associated with the comparison parameter which has the high similarity with the singing characteristic parameter is selected, the information of the music piece based on the selected music piece data is displayed, the music piece related information includes genre data which indicates a music genre, and the comparison parameter includes a parameter which indicates a musical characteristic of the music genre, storing music piece genre similarity data which indicates a similarity between the music piece and the music genre; and calculating a similarity between the singing characteristic parameter and the music genre, wherein the music piece data is selected based on the calculated similarity and the stored music piece genre similarity data.

28. A computer system operable to display music information that correlates to a singing user, the system comprising:

a voice input device to obtain voice data from the singing user;

computer writeable storage medium configured to store:

a representation of a plurality of music pieces;

a plurality of comparison parameters that are associated with each one of the plurality of music pieces;

music piece genre similarity data which indicates a similarity between the music piece and a music genre; and a processor configured to:

analyze the voice data of the singing user and calculate a plurality of singing characteristic parameters that correlate to the singing characteristics of the singing user;

determine a degree of similarity between each one of the plurality of singing characteristic parameters to the plurality of comparison parameters of the plurality of music pieces;

select results, the results including at least one music piece from the plurality of music pieces where the degree of similarity is determined to be substantially high;

generate a display of the results for the singing user, wherein the representation of the plurality of music pieces includes music piece data for reproducing at least the music piece, the comparison parameters includes a parameter which indicates a musical characteristic of the music piece so as to be associated with the music piece data, at least one piece of the music piece data which is associated with the comparison parameter which has the high similarity with the singing characteristic parameter is selected, information of the music piece based on the selected music piece data is displayed, the music piece related information includes genre data which indicates the music genre, and the comparison parameter includes a parameter which indicates a musical characteristic of the music genre; and calculate a similarity between the singing characteristic parameter and the music genre, wherein the music piece data is selected based on the calculated similarity and the stored music piece genre similarity data.

29. A method for correlating a music piece to a singing user of a computer music system, the method comprising:

obtaining voice data from the singing user;

analyzing the voice data to calculate a plurality of singing characteristic parameters which correspond to singing characteristics of the singing user;

storing music piece related information concerning a plurality of music pieces and a plurality of comparison parameters associated with each one of the plurality of music pieces;

comparing the plurality of singing characteristic parameters with the plurality of comparison parameters to calculate a similarity between the plurality of singing characteristic parameters and the plurality of comparison parameters;

selecting at least one music piece from the plurality of music pieces when the similarity between the plurality of comparison parameters to the plurality of singing characteristic parameters is high;

displaying results based on the at least one music piece selected, wherein the music piece related information includes genre data which indicates at least a music genre, the comparison parameter includes a parameter which indicates a musical characteristic of the music genre so as to be associated with the music genre, the music genre which is associated with the comparison parameter which has the high similarity with the singing characteristic parameter is selected, and a name of the music genre as information based on the music piece related information is displayed.

30. A computer system operable to display music information that correlates to a singing user, the system comprising:

a voice input device to obtain voice data from the singing user;

computer writeable storage medium configured to store:

music piece related information concerning a plurality of music pieces;

a plurality of comparison parameters that are associated with each one of the plurality of music pieces;

a processor configured to:

analyze the voice data of the singing user and calculate a plurality of singing characteristic parameters that correlate to the singing characteristics of the singing user;

determine a degree of similarity between each one of the plurality of singing characteristic parameters to the plurality of comparison parameters of the plurality of music pieces;

select results, the results including at least one music piece from the plurality of music pieces where the degree of similarity is determined to be substantially high; and generate a display of the results for the singing user, wherein the music piece related information includes genre data which indicates at least a music genre, the comparison parameters include a parameter which indicates a musical characteristic of the music genre so as to be associated with the music genre, the music genre which is associated with the comparison parameter which has the high similarity with the singing characteristic parameter is selected, and a name of the music genre as information based on the music piece related information is displayed.

* * * * *